US012638602B2

(12) United States Patent (10) Patent No.: US 12,638,602 B2

Aspinwall et al. (45) Date of Patent: May 26, 2026

(54) METAL ORGANIC FRAMEWORK PARTICLES AS RADIOISOTOPE DETECTORS

(71) Applicant: Arizona Board of Regents on Behalf of The University of Arizona, Tucson, AZ (US)

(72) Inventors: Craig Aspinwall, Tucson, AZ (US); Chen-Yi Ke, Tucson, AZ (US); Minhui Han, Tucson, AZ (US); Brian Zacher, Tucson, AZ (US)

(73) Assignee: Arizona Board of Regents of Behalf of The University of Arizona, Tucson, AZ (US)

( * ) Notice: Subject to any disclaimer, the term of this patent is extended or adjusted under 35 U.S.C. 154(b) by 229 days.

(21) Appl. No.: 18/642,605

(22) Filed: Apr. 22, 2024

(65) Prior Publication Data

US 2024/0280712 A1 Aug. 22, 2024

Related U.S. Application Data

(63) Continuation-in-part of application No. PCT/US2022/047509, filed on Oct. 22, 2022.

(60) Provisional application No. 63/271,058, filed on Oct. 22, 2021, provisional application No. 63/519,878, filed on Aug. 16, 2023.

(51) Int. Cl.
*G01T 1/20* (2006.01)

(52) U.S. Cl.
CPC .......... *G01T 1/2012* (2013.01); *G01T 1/2006* (2013.01)

(58) Field of Classification Search
CPC ...... G01T 1/2012; G01T 1/2006; G01T 1/203
See application file for complete search history.

(56) References Cited

FOREIGN PATENT DOCUMENTS

| WO | 2016049571 A1 | 3/2016 |
| WO | 2022238928 A1 | 11/2022 |

OTHER PUBLICATIONS

Mauree et al. "Detection of Radioactive Gas with Scintillating MOFs" Advanced Functional Materials, vol. 33, Issue 31 (Year: 2023).*

Sun et al. "Metal-organic framework scintillators detect radioactive gases" Nature Photonics vol. 17, pp. 646-647 (Year: 2023).*

International Search Report received for PCT Patent Application No. PCT/US2022/047509, mailed on Jan. 27, 2023, 5 pages.

Atzrodt , et al., "Deuterium- and Tritium-Labelled Compounds: Applications in the Life Sciences", Angewandte Chemie International Edition, vol. 57, No. 7, 2018, pp. 1758-1784.

Bosworth , et al., "Scintillation proximity assay", Nature, vol. 341, No. 6238, 1989, pp. 167-168.

Brooks, F D, "Development of Organic Scintillators", Nuclear Instruments and Methods, vol. 162, No. 1-3, 1979, pp. 477-505.

Cavka, et al., "A new zirconium inorganic building brick forming metal organic frameworks with exceptional stability", J. Am. Chem. Soc., vol. 130, No. 42, 2008, pp. 13850-13851.

(Continued)

*Primary Examiner* — Courtney D Thomas

(74) *Attorney, Agent, or Firm* — PABST PATENT GROUP LLP

(57) ABSTRACT

Described herein are metal organic framework (MOF) particles and methods for detecting and quantifying radioisotopes with such MOF particles, where detecting and quantifying such radioisotopes can occur in a solvent.

20 Claims, 18 Drawing Sheets

(56)            References Cited

OTHER PUBLICATIONS

Chen , et al., "Color-Tunable and High-Efficiency Dye-Encapsulated Metal-Organic Framework Composites Used for Smart White-Light-Emitting Diodes", ACS Applied Materials & Interfaces, vol. 10, No. 12, May 17, 2018, pp. 18910-18917.

Chen , et al., "In Vivo Targeting and Positron Emission Tomography Imaging of Tumor with Intrinsically Radioactive Metal-Organic Frameworks Nanomaterials", ACS Nano., vol. 11, No. 4, Apr. 25, 2017, pp. 4315-4327.

Decker , et al., "Controlling Size, Defectiveness, and Fluorescence in Nanoparticle UiO-66 through Water and Ligand Modulation", Chemistry of Materials, vol. 31, No. 13, Jun. 10, 2019, pp. 4831-4839.

Furukawa , et al., "The chemistry and applications of metal-organic frameworks", Science, vol. 341, No. 6149:1230444, Aug. 30, 2013, 13 pages.

Gutierrez , et al., "Confinement of Luminescent Guests in Metal-Organic Frameworks: Understanding Pathways from Synthesis and Multimodal Characterization to Potential Applications of LG@MOF Systems", Chemical Reviews, vol. 122, No. 11, Apr. 1, 2022, pp. 10438-10483.

Janczak , et al., "Hybrid Nanoparticle Platform for Nanoscale Scintillation Proximity Assay", ACS Applied Nano Materials, vol. 2, No. 3, Feb. 20, 2019, pp. 1259-1266.

Janczak , et al., "Polystyrene Core, Silica Shell Scintillant Nanoparticles for LowEnergy Radionuclide Quantification in Aqueous Media", ACS Appl Mater Interfaces, vol. 10, No. 5, Jan. 12, 2018, pp. 4953-4960.

Li , et al., "Tantalum-Zirconium Co-Doped Metal-Organic Frameworks Sequentially Sensitize Radio-Radiodynamic-Immunotherapy for Metastatic Osteosarcoma", Adv Sci (Weinh)., vol. 10, No. 10, 2023, 16 pages.

Liu , et al., "Suppressing Nonradiative Processes of Organic Dye with Metal-Organic Framework Encapsulation toward Near-Infrared Solid-State Microlasers", ACS Applied Materials & Interfaces, vol. 10, No. 41, 2018, pp. 35455-35461.

Lu , et al., "Photoluminescence properties of Ce3+ doped YSiO2N blue-emitting phosphors", Journal of Rare Earths, vol. 30, No. 9, Sep. 2012, pp. 851-855.

Megelski , et al., "Orientation of Fluorescent Dyes in the Nano Channels of Zeolite L", The Journal of Physical Chemistry B, vol. 105, No. 1, 2001, pp. 25-35.

Perego , et al., "Composite fast scintillators based on high-Z fluorescent metal-organic framework nanocrystals", Nature Photonics, vol. 15, May 2021, pp. 393-400.

Song , et al., "A hydrolytically stable europium-organic framework for the selective detection of radioactive Th4+ in aqueous solution", CrystEngComm., vol. 21, No. 22, 2019, pp. 3471-3477.

Wang , et al., "A dye encapsulated zinc-based metal-organic framework as a dual-emission sensor for highly sensitive detection of antibiotics", Dalton Trans., vol. 51, No. 2, Nov. 30, 2021, pp. 685-694.

Wang , et al., "Synergistic Assembly of Heavy Metal Clusters and Luminescent Organic Bridging Ligands in Metal-Organic Frameworks for Highly Efficient X-ray Scintillation", Journal of the American Chemical Society, vol. 136, No. 7, Apr. 1, 2014, pp. 6171-6174.

Wei , et al., "Wavelength-Tunable Microlasers Based on the Encapsulation of Organic Dye in Metal-Organic Frameworks", Adv Mater., vol. 28, No. 34, 2016, pp. 7424-7429.

Wu , et al., "Polydiacetylene-Enclosed Near-Infrared Fluorescent Semiconducting Polymer Dots for Bioimaging and Sensing", Analytical Chemistry, vol. 86, No. 10, Apr. 21, 2014, pp. 4831-4839.

Ye, et al., "Polymers Recognizing Biomolecules Based on a Combination of Molecular Imprinting and Proximity Scintillation: A New Sensor Concept", Journal of the American Chemical Society, vol. 123, No. 12, Mar. 6, 2001, pp. 2901-2902.

Zhao , et al., "Soft X-Ray Stimulated Lanthanide@MOF Nanoprobe for Amplifying Deep Tissue Synergistic Photodynamic and Antitumor Immunotherapy", Adv Healthc Mater., vol. 10, No. 21: e2101174, Nov. 3, 2021, 12 pages.

* cited by examiner

Terphenyl trans-stilbene 1,4-Phenylene-2,2'-bisoxazole

X = N, PPD
X = C, PPO

Suzuki coupling to extend the core structures

FIG. 5B

| Linker (L) | Molecular Structure | Source |
|---|---|---|
| 1 | | Synthesized |
| 2 | | Synthesized |
| 3 | | TCI America, Inc. |
| 4 | | TCI America, Inc. |
| 5 | | AbaChemScene, Inc. |

FIG. 5C

| Linker# | Fluorescence emission wavelength (nm) | | Scintillation response |
| | Linker in solution | Incorporated in MOFs | Amount of: MOFs/tritium acetate/CPM |
| --- | --- | --- | --- |
| 1 | 420 | 475 | 0.025 mg-mL$^{-1}$/2000 nCi/10907 |
| 2 | 490 | 508 | 0.025 mg-mL$^{-1}$/2000 nCi/298 |
| 3 | 438/465 | 461 | 0.025 mg-mL$^{-1}$/2000 nCi/ 287 |
| 4 | 355/370 | 450 | Yield was low and no measure its scintillation response |
| 5 | - | - | 1.136 mg-mL$^{-1}$/2000 nCi/2987 |

FIG. 6

Primary fluorescent additives

FIG. 7

Figure 7:
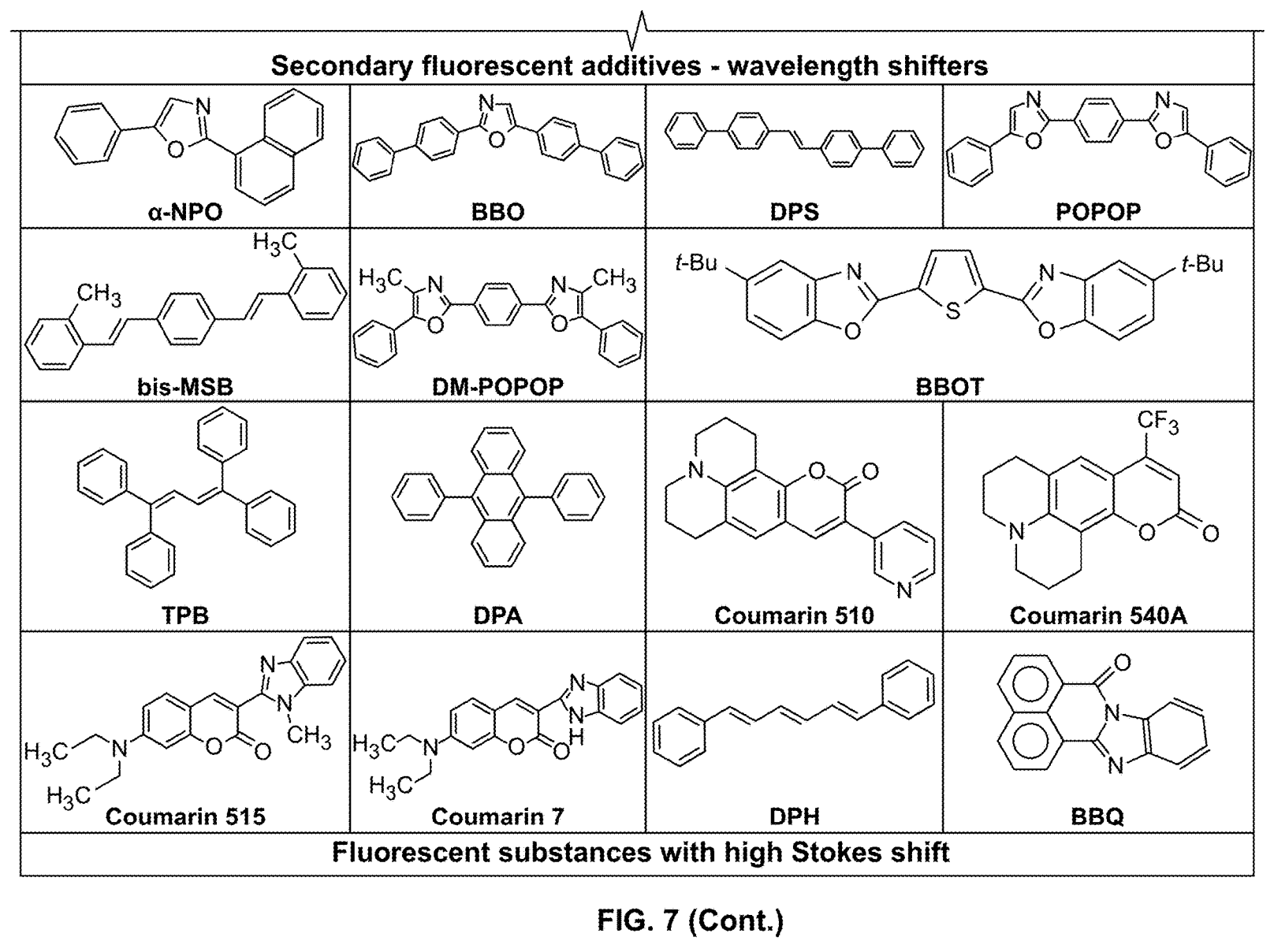

Secondary fluorescent additives - wavelength shifters

POPOP

DPS

BBO

α-NPO

BBOT

DM-POPOP bis-MSB

Coumarin 540A

Coumarin 510

DPA

TPB

BBQ

DPH

Coumarin 7

Coumarin 515

Fluorescent substances with high Stokes shift

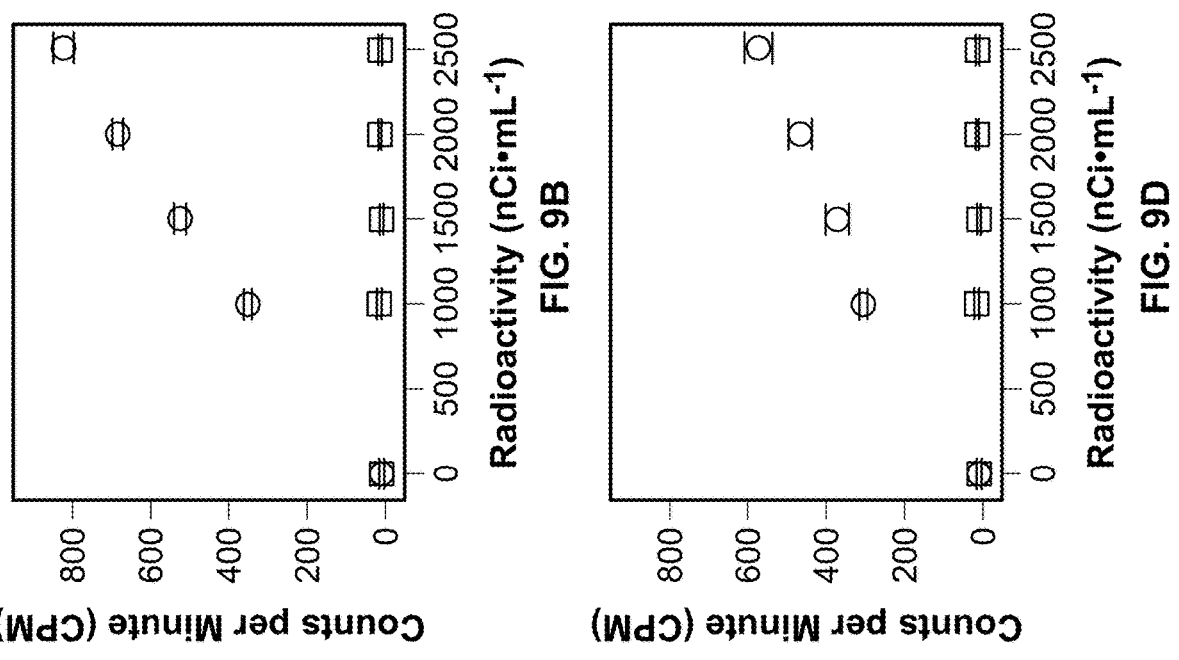
FIG. 9B
FIG. 9D
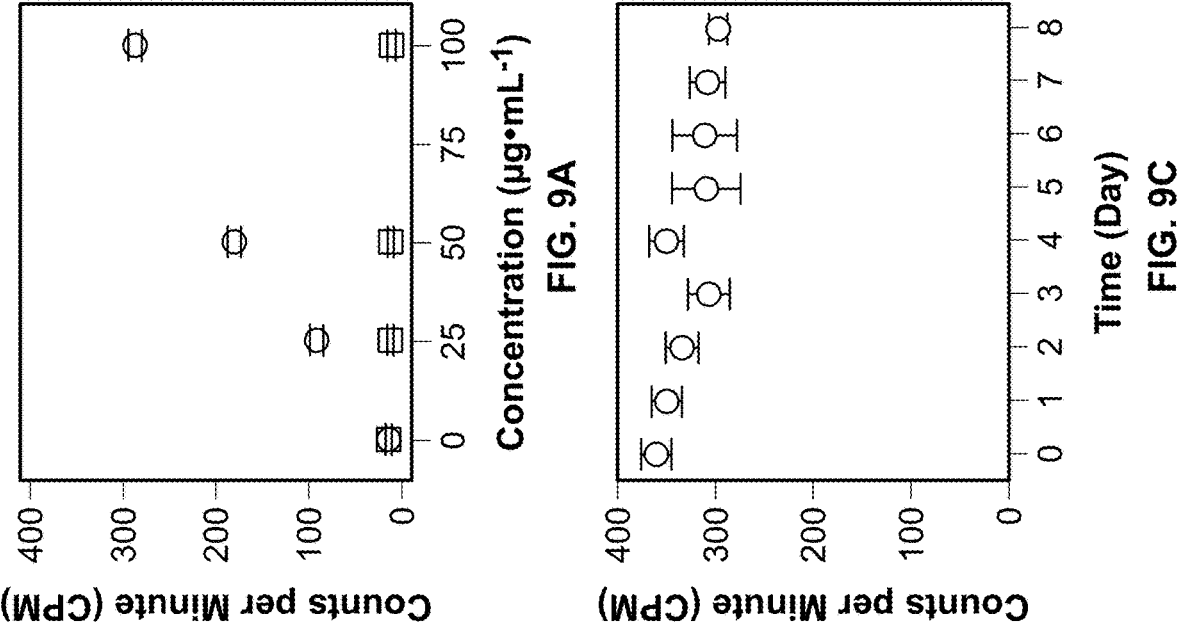
FIG. 9A
FIG. 9C

Cysteine

ATP

| Radionuclide | Beta-decay | Decay energy (keV) | | Half-life |
| --- | --- | --- | --- | --- |
| | | Maximum | Average | |
| ³H | β⁻ | 18.6 | 5.7 | 12.32 years |
| ¹⁴C | β⁻ | 158 | 49 | 5730 years |
| ³³P | β⁻ | 249 | 76.4 | 25.3 days |
| ³⁵S | β⁻ | 167 | 48.6 | 87.4 days |

| Radionuclide | Mean path-length in water |
|---|---|
| $^3$H | 1.5 um |
| $^{14}$C | 50 um |
| $^{33}$P | 126 um |
| $^{35}$S | 66 um |

β particle

³H-acetate self-assembly

Zr-UiO68-MOFs

Linker

Trifluoroacetic acid

● Metal ion

⬤ Metal node

β particle stimulates Zr node

Zr node releases absorbed energy

Visible light

³H-acetate-induced Scintillation

METAL ORGANIC FRAMEWORK PARTICLES AS RADIOISOTOPE DETECTORS

CROSS REFERENCE TO RELATED APPLICATIONS

This application claims priority to U.S. Application No. 63/519,878, filed Aug. 16, 2023, and is a continuation-in-part application of PCT/US2022/047509, filed Oct. 22, 2022, which claims priority to U.S. Application No. 63/271,058, filed on Oct. 22, 2021, the contents of which are hereby incorporated by reference in its entirety.

STATEMENT OF FEDERALLY SPONSORED RESEARCH AND DEVELOPMENT

This invention was made with government support under Grant No. 1807343 awarded by National Science Foundation. The government has certain rights in the invention.

FIELD OF THE INVENTION

The field of the invention relates generally to the detection of radioisotopes.

BACKGROUND

This background information is provided for the purpose of making information believed by the applicant to be of possible relevance to the present invention. No admission is necessarily intended, nor should it be construed, that any of the information disclosed herein constitutes prior art against the present invention.

Radioisotope (RI) labels remain a key tool for drug discovery applications, particularly for measuring analytes that are not inherently detected by traditional optical microscopy or electrochemical methods. Though new analytical approaches, including mass spectrometry, allow sensitive detection of label free mixtures, the high sensitivity and small sample requirements are unparalleled, making radioassays indispensable.

RI labels play a fundamental role in the investigation of biological, medical environmental, and nuclear systems, particularly for analytes that are not detectable by traditional optical microscopy or electrochemical approaches. RI labels have a key role in the high sensitivity detection of compounds as diverse as small molecule enzyme inhibitors, receptor agonists and antagonists, carbohydrates and carbohydrate derivatives, proteins and many others. RIs facilitate highly sensitive detection with minimal perturbation of the size and structure of the analyte, compared to fluorescent labels, a particularly important property in drug discovery applications. This property makes them particularly amendable for studies such as drug screening, identification and functional assays, environmental tracing, in vivo and in vitro imaging, and nuclear waste management and proliferation studies. For example, small molecules can be readily labeled with $^3$H, $^{14}$C, $^{35}$S, $^{33}$P or other radioisotopes and subsequently detected in water, agricultural and other samples to better understand the molecule fate, metabolism and distribution. Additionally, heavy metal isotopes such as $^{64}$Cu, $^{235}$U, $^{225}$Ac, $^{227}$Th and others, are increasingly used for nuclear medicine and functional imaging, detection of nuclear proliferation and understanding of waste runoff and disposal applications. Further, radioactive ions such as $^{22}$Na and $^{86}$Rb enable highly sensitive ion flux assays. These applications are in addition to more traditional assays that rely on radioisotopes to better understand metabolic processes in biological and environmental samples that enable determination of fate, lifetime, distributions and other factors of environmental contaminants and biological pathways. RI labels provide unparalleled sensitivity and precision for ligand-receptor binding assays, including G-protein coupled receptor assays.

Though recent decades have witnessed significant advances in molecular analysis platforms, RI labels continue to provide a critical approach for detection of a wide range of biologically important applications. Beta-particle emitters have proven valuable to label small and large organic molecules. Of the beta emitters, $^3$H is among the most important radioisotopes for biological studies based on low mass differences between labeled and unlabeled compounds, a reasonable half-life (12.3 years) for storage, low maximum decay energy (Emax=18.6 keV), short penetration depth in water (<2.0 μm), and relative safety. $^{35}$S and $^{33}$P are also commonly used labels for the same reasons, although they have a slightly higher maximum decay energies (Emax=167 keV and 249 keV respectively), longer penetration depths in water (up to 31 μm and 60 μm), and shorter half-lives (87.4 and 25.3 days). $^{32}$P is higher in energy (Emax=1.71 MeV) but is still commonly used in traditional protein and DNA/RNA assays. The ubiquity of these atoms in biological and pharmaceutical structures, makes it possible to synthesize labeled variants that exhibit minimal perturbations to the chemical and biochemical activity, and thus enable analyses that cannot be performed using larger fluorescent labels.

A single β-particle, emitted from an RI label, can produce hundreds of photons or more, depending on its energy, as it passes through a scintillating medium. Due to the lack of an excitation source, this detection approach occurs with zero background leading to remarkable sensitivity. Scintillant materials that are sensitive to low-energy β-emission are essential for enabling the study of manifold biological processes. A key challenge in sensing low-energy radioisotopes with scintillant materials is the relatively short penetration depth of their decay products (e.g., alpha-, beta-, gamma particles) and the typically low decay energies of common radioisotopes used for biological, environmental and nuclear applications. For example, tritium ($^3$H) exhibits a mean penetration depth of only around 0.5 μm in aqueous systems with a maximum penetration of dept of 1.5 μm, which requires the scintillant material to be within 1.5 μm of a decaying radionuclide for detection.

In some instances, it is important to measure the specific molecule that contains the radioactive label, conditions for which LSC and SSC lack the inherent molecular specificity required. For example, when the products of an enzymatic reaction are the analytes, the RI-labeled substrate and any labeled products will be detected indiscriminately. Finally, the organic solvent component of LSC, in particular, is incompatible with detection directly in biomolecular and biological systems since the organic liquid can disrupt key molecular species in the analysis, e.g. proteins. Additionally, measurements in LSC generate large volumes of radioactive mixed waste that must be collected and disposed according to state and federal regulations, and the toxicity and volatility of the primary solvent components of many LSC formulations complicate their transport, storage, and disposal.

Solid scintillant materials prepared from dye-doped polymers or scintillating inorganic glasses provide an alternative to detect β-emission and have the advantage of functioning in aqueous environments. Doped glass matrices can be ground into microparticles with irregular shapes and high density compared to synthetic particles. Polymer matrices that incorporate scintillant fluorophores facilitate the transfer of energy from the β-emission to visible photons, in a manner analogous to scintillation cocktails. In fact, scintillating polymer particles function simply as a solid version of scintillation cocktail. Polymer materials can be formed into microparticles or molded into various sample geometries, including 96-well plates, that enable high throughput detection. Due to the minimized organic solvent, solid materials generate much less organic waste. The primary drawback of solid scintillation counting is the reduced scintillation efficiency that arises from the increased separation distance between scintillating particles and individual β-emission events compared to dyes dispersed in solvent, leading to poor photon conversion.

Low-energy beta (β) radioemitters ($^3$H, $^{14}$C, $^{33}$P, $^{35}$S) can be quite useful as labels in biological research, but the sensing and quantifying of β emission is challenging given its characteristic low decay energy and short penetration depth in aqueous solutions. Current proximity-based p emitter sensing options are often based on scintillating fluorophore-doped polymeric particles or yttrium silicate spheres, but intrinsic aqueous instabilities, chemical instability, and/or low efficiencies result in low sensitivity and limit their applicability in biological fields. Unfortunately, the low energy and short penetration depth of most common, biologically relevant RIs also complicate detection, limiting the capabilities for this approach.

Scintillation proximity assay (SPA) provides molecular selectivity, via integration of selective molecular binding events; however, there are fundamental limitations of conventional polymer or inorganic SPA materials that limit the applicability of these materials for a wide range of environmental, medical, and biological problems that might be better addressed using RI labels if sufficient detection capabilities can be obtained.

Metal-organic frameworks (MOFs) are crystalline materials consisting of metal nodes/clusters coordinated with organic linkers to yield continuous and repetitive motifs in an ordered three-dimensional network. MOFs elegantly maintain advantageous characteristics of both the organic small molecule linker component (e.g., tunable fluorescence) and the coordinated inorganic structure component (e.g., stability, pore size, surface properties). MOFs have been prepared with significant structural and functional variations through substitution of the inorganic or organic components. Since their discovery in 1995, MOFs have found wide-ranging applications in fluorescent sensing, adsorption/storage/separation, organic catalysis, and biomedical studies.

The optical properties of fluorescent MOFs are particularly intriguing. A defining characteristic of fluorescent MOFs is spatial confinement of coordinated fluorophores, which is imparted by their rigid structure and mitigates aggregation-induced optical quenching that is commonly observed in fluorophore-encapsulated materials. This unique and highly advantageous characteristic has played a key role in the rapid integration of MOFs into fluorescence bioimaging, OLED displays, advanced photonics, and scintillant materials.

Scintillating properties of certain materials is based on the inclusion of fluorescent dopants, but doping homogeneity plays an important role. Lack of control in the ability to modulate the homogeneity can adversely affect the key properties of such doped materials.

However, there is a need for improved compositions which address issues of the homogeneity of fluorescent dopants in materials capable of scintillating. There is also a need for improved compositions, and methods of using thereof, for measuring radioisotopes (e.g., alpha-emitter, β-emitters, and gamma emitters) particularly for measurements obtained directly in liquids, such as water or aqueous solvents. Accordingly, it is an object of the present invention to provide compositions and methods for measuring radioisotopes which address the aforementioned needs.

BRIEF DESCRIPTION OF THE FIGURES

The following drawings form part of the present specification and are included to further demonstrate certain aspects of the present invention. The invention may be better understood by reference to one or more of these drawings in combination with the detailed description of specific embodiments presented herein.

Particular non-limiting embodiments of the present invention will now be described with reference to accompanying drawings.

(FIG. 2A) Scanning electron microscope image demonstrates successful preparation of Zr-MOF particles. (FIG. 2B) Energy dispersive spectrum obtained with Zr-MOF particles supporting the analysis that UiO-68 composition and structure was attained. The x-axis shows energy in kilo electron volts (KeV) and the y-axis shows counts.

Figure 5B:
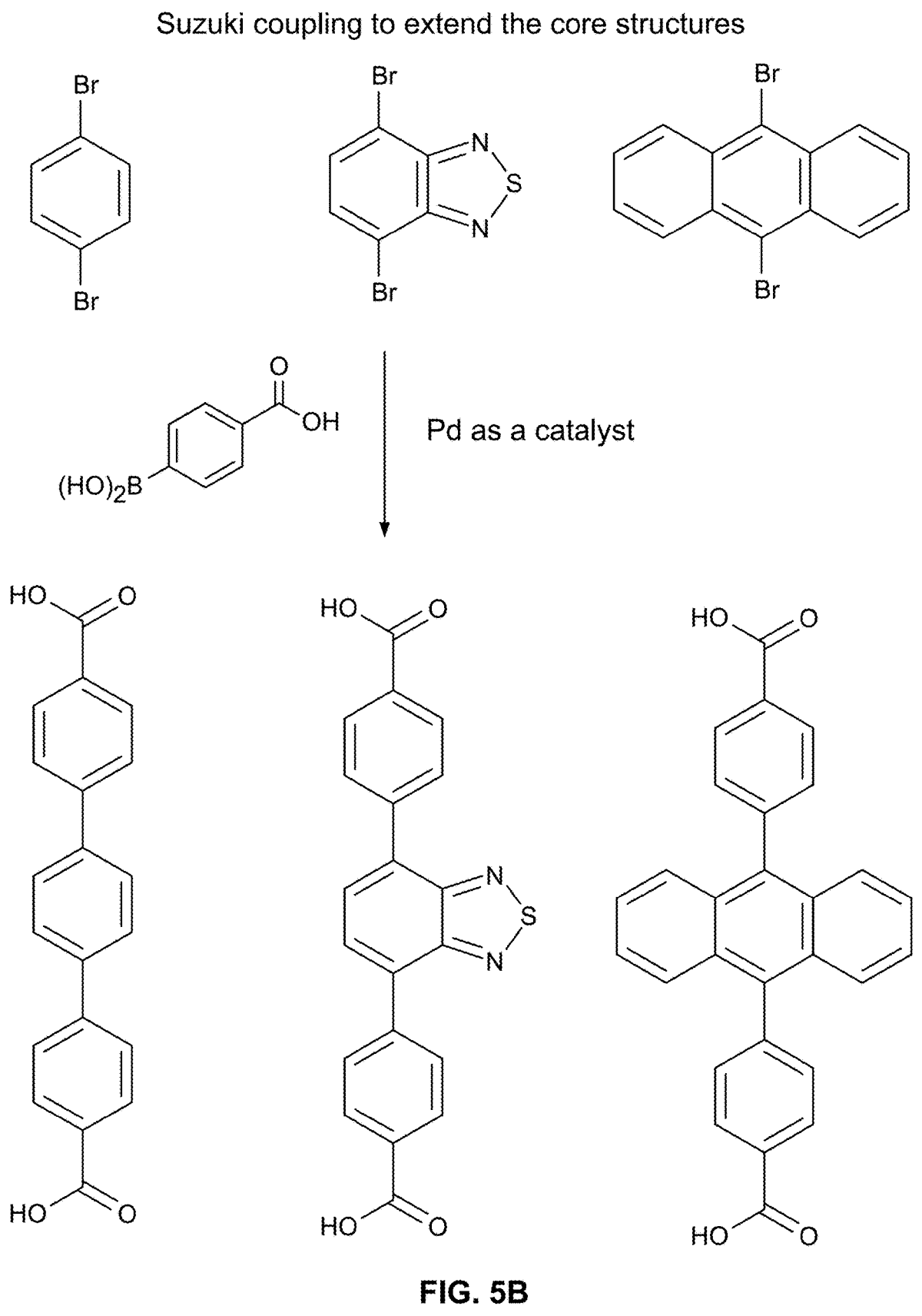

FIG. 5B provides exemplary synthetic pathways to synthesize MOF-forming linkers with the requisite luminescent core that are subsequently used to prepare scintillatable MOFs.

FIG. 5C shows chemical structures of organic luminescent linkers (L) that may be incorporated into scintillating MOF particles (as exemplary embodiments of the invention) and characterized as low-energy β emission sensing particles.

FIG. 6 provides characterization data for MOF particles fabricated with linkers 1-5 from FIG. 5C demonstrating their functionality for detection of low energy β emission. The 'Linker in solution' column refers to the maximal emission wavelength for the linkers in solution, when not incorporated in MOFs. The 'Incorporated in MOFs' column refers to the wavelength of maximal emission for the linkers once incorporated in MOFs; serving as evidence for successful preparation of MOFs. 'Scintillation response' column specifies the concentration of MOF particles, intensity of radioactivity by addition of tritium acetate, and the scintillation counts-per-minute (CPM).

Figure 7:
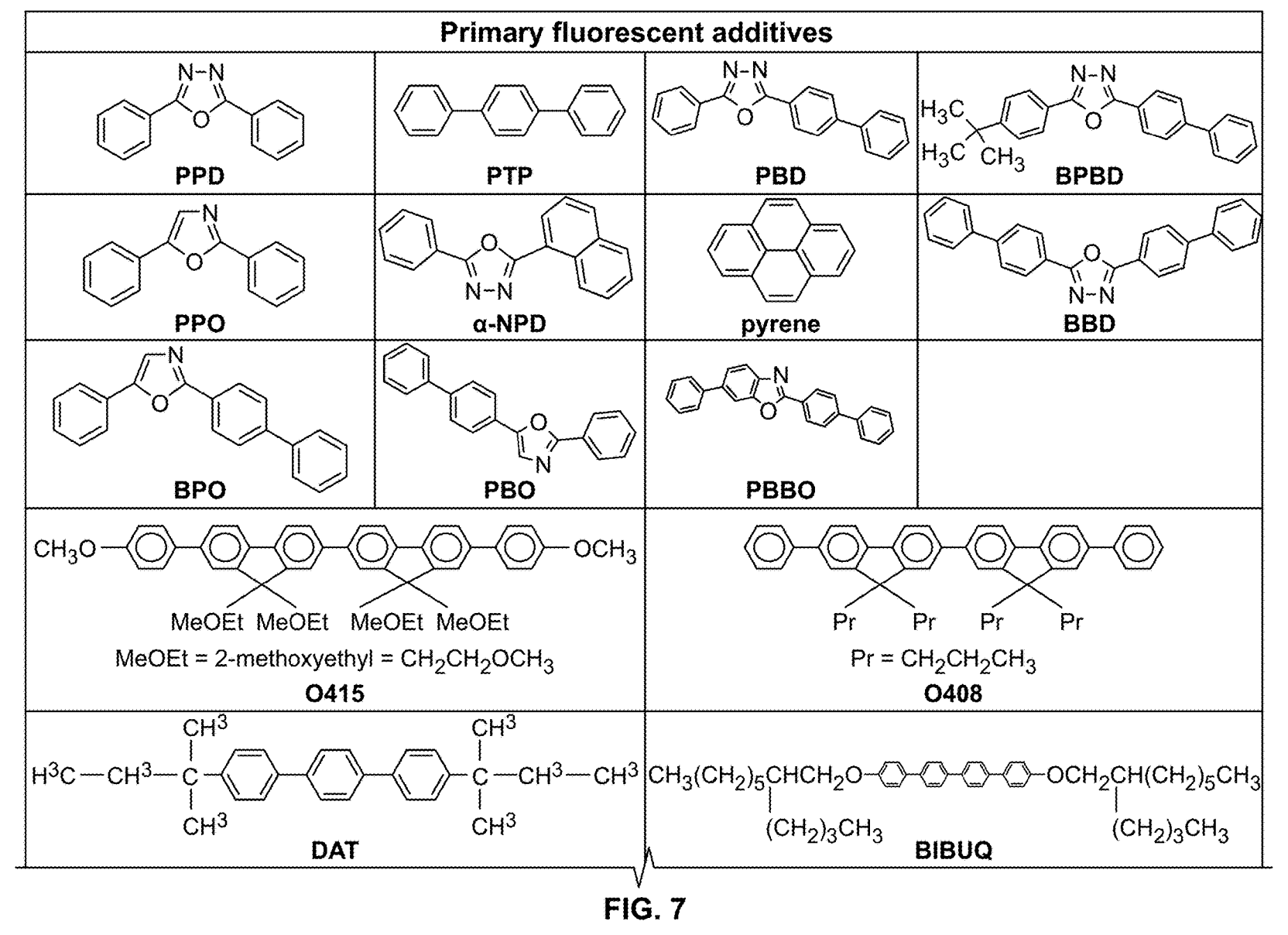

FIG. 7 provides chemical structures of proposed additional organic linkers (L), primary fluorescent additives, secondary fluorescent additives-wavelength shifters; and fluorescent substances with high Stokes shift, that have potential in MOF scintillating particles.

FIG. 8 shows chemical structures and synthesis of DPA carboxylic derivative linker 4,4'-(9,10-Anthracenediyl)bis [benzoic acid, cas #42824-53-3.

FIGS. 9A-9D. (FIG. 9A) scintillation responses of Zr-UiO68-MOFs having DPA linker in the presence of $^3$H-acetate and shows effect of Zr-UiO68-MOFs concentration. The concentration of Zr-UiO68-MOFs was increased from 25 to 100 µg·mL$^{-1}$ in the presence (circles) and absence (squares) of 1000 nCi·mL$^{-1}$ of $^3$H-acetate.

(FIG. 9B) shows effect of $^3$H radioactivity. Radioactivity of $^3$H-acetate was increased in range from 0 to 2500 nCi·mL$^{-1}$ while in the presence (circles) and absence (squares) of 250 µg·mL$^{-1}$ of Zr-UiO68-MOFs.

(FIG. 9C) shows time-dependent scintillation measurement of 200 µg·mL$^{-1}$ of Zr-UiO68-MOFs in the presence of 1000 nCi·mL$^{-1}$ of $^3$H-acetate.

(FIG. 9D) shows effect of BSA. Radioactivity of $^3$H-acetate was increased in range from 0 to 2500 nCi·mL$^{-1}$ while in the presence (circles) and absence (squares) of 250 µg·mL$^{-1}$ of Zr-UiO68-MOFs in 1 mg·mL$^{-1}$ BSA (bovine serum albumin) solutions. The error bars represent the standard deviation of three independent measurements.

(FIG. 12B) subsequent scintillation detection of low-energy radionuclides. $^3$H-labelled analyte first emits a low-energy β particle during radioactive decay, which subsequently excites the Zr node, releasing absorbed energy to stimulate the fluorescent linker into an excited electronic state. Relaxation of the linker to the ground state results in the emission of visible photons that can be detected.

(FIG. 14A) Thermogravimetric analysis (TGA) of pristine UiO-66. (FIG. 14B) fluorescence spectra of pristine UiO-66 (solid line) and after doping with fluorophores (dotted line). (FIG. 14C) hydrodynamic diameters of pristine UiO-66 (top graph) and after doping with fluorophores (bottom graph).

(FIG. 15A) Representative schematic illustration of detection mechanism of low-energy radioisotopes by fluorophore-doped UiO-66 through energy conversion from emitted energy of a decaying nucleus to visible emissions. The overall process is referred to as scintillation. The emitted energy is in a form of beta particles. It is understood that the beta particles first stimulate the inorganic components (i.e., Zr node) of UiO-66, then the excited Zr node transfers the absorbed energy to excite the doped fluorophores, after excited fluorophores undergo relaxation, a flash of visible photos are emitted that could be detected. (FIG. 15B) Graph of the effects of doped fluorophores. Scintillation responses of undoped UiO 66 (baseline dots), fluorophore-doped UiO-66 (ascending dots) as incubating with 100 nCi·mL$^{-1}$ tritium radioactivity. UiO-66 concentration was in range from 0 to 60 µg·mL$^{-1}$. (FIG. 15C) Graph of the effect of radioactivity. Scintillation responses of blank solutions (baseline dots), undoped UiO-66 (baseline dots) (note the responses of blank solutions are generally aligned with the responses of undoped UiO-66), fluorophore-doped UiO-66 (ascending dots) as incubating with an increasing tritium radioactivity from 0 to 150 nCi·mL-1.

DESCRIPTION

Definitions

Figure 1:
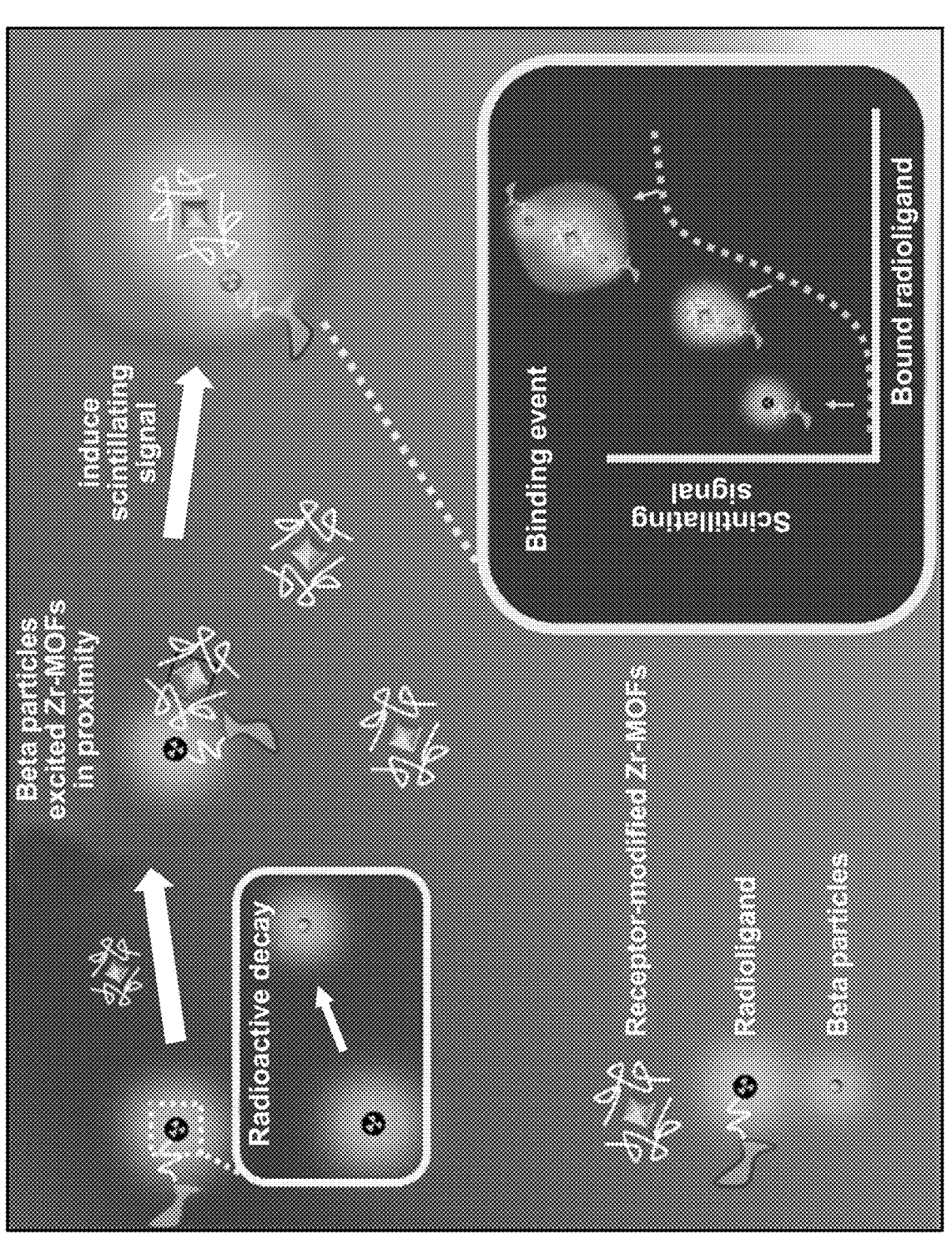
FIG. 1 provides a functional scheme for zirconium metal organic framework (Zr-MOF) particles based scintillation proximity assay to quantify radioligands in aqueous solution. Upon radioactive decay, beta particles released by proximal radioligands are absorbed by Zr-MOF particles which transduce this energy into visible scintillation events. The magnitude of the scintillating signal is a function of the amount of radioligands proximal to Zr-MOF particles.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated invention, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used).

The use of "or" means "and/or" unless stated otherwise.

The use of "a" or "an" herein means "one or more" unless stated otherwise or where the use of "one or more" is clearly inappropriate.

The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

As used herein, the term "about" refers to a ±10% variation from the nominal value. It is to be understood that such a variation is always included in any given value provided herein, whether or not it is specifically referred to.

"Scintillatable", as used herein, refers to a material that is capable of emitting photons of light of a defined wavelength in response to the absorption of an alpha particle, a beta particle, or gamma irradiation emitted by a radioisotope as the radioisotope decays.

"Metal-organic framework" or "MOF", as used herein, refers to metal-organic frameworks that are organic-inorganic hybrid crystalline porous materials that consist of a regular array of positively charged metal ions surrounded by organic 'linker' molecules. The metal ions form nodes that bind the arms of the linkers together to form a repeating, cage-like structure having porosity. Due to this hollow structure, MOFs have an extraordinarily large internal surface area.

The term "polyaromatic organic linker compound" as used herein refers to a moiety with 2 or more aryl and/or heteroaryl rings with one or more metal binding functionalities. Metal binding functionalities include carboxylic acid, amine, thiol, sulfate, nitrite, nitro, azide and other ligands that include a lone pair of electrons. The polyaromatic organic linker compound may be substituted or unsubstituted. In embodiments, the polyaromatic organic linker compound is preferably includes one or more carboxylic acid functionalities.

As used herein, the term "heteroaromatic", "heteroaryl", or like terms, refers to groups having 5 to 14 ring atoms; 6, 10 or 14 pi-electrons shared in a cyclic array; and containing carbon atoms and 1, 2 or 3 oxygen, nitrogen or sulfur heteroatoms. The term "heteroaromatic", "heteroaryl" encompasses a monocyclic or a polycyclic, unsaturated radical containing at least one heteroatom, in which at least one ring is aromatic. Polycyclic heteroaryl rings must contain at least one heteroatom, but not all rings of a polycyclic heteroaryl moiety must contain heteroatoms. Each heteroatom is independently selected from nitrogen, which can be oxidized (e.g., N(O)) or quaternized, oxygen and sulfur, including sulfoxide and sulfone.

The point of attachment of a heteroaromatic or heteroaryl ring may be at either a carbon atom or a heteroatom. Heteroaryl groups may be optionally substituted with one or more substituents.

The term "aryl" as used herein by itself or as part of another group refers to monocyclic, bicyclic, polycyclic aromatic groups containing from 6 to 12 carbons in the ring portion, preferably 6-10 carbons in the ring portion, such as the carbocyclic groups phenyl, naphthyl or tetrahydronaphthyl.

"Weak gamma photon energy", as used herein refers to gamma rays having an energy less than about 8 MeV.

The term "radioisotope" as used herein refers to a radioactive isotope that is "free" (in other words not bound to another molecule or molecular entity), or that is bound to a molecule. In some embodiments, the radioisotope may be bound to an organic or inorganic molecule to obtain as "radioligand". For example, the radioligand may be configured such that the organic or inorganic molecule is chemically modified such that it contains a radioactive (radioisotope) atom in one or more positions. The radioisotope may be associated with the organic or inorganic molecule via ionic bonds, Van der Waals interactions, etc.

Non-limiting examples of radioligands can include molecules (e.g. drug candidates) that have been labeled with $^3$H, pesticides that have been labeled with $^{14}$C, proteins labeled with $^{31}$S, nucleic acids labeled with $^{33}$P and any other combination of molecule and radioisotope. Radioligands may be bound to a secondary biochemical moiety, such as an antibody, membrane receptor, enzyme, nucleic acid or other chemically selective moiety.

LIST OF ABBREVIATIONS

α-NPO: 2-(1-naphthyl)-5-phenyloxazole, CAS #846-63-9.

BBO: 2,5-Di(4-biphenylyl)oxazole, CAS #2083-09-2.

DPS: trans-4,4'-diphenylstilbene, CAS #2039-68-1.

POPOP: 1,4-Bis(5-phenyl-2-oxazolyl)benzene, CAS #1806-34-4.

bis-MSB: 1,4-bis(2-methylstyryl)benzene, CAS #13280-61-0.

DM-POPOP: 1,4-bis(4-methyl-5-phenyl2-oxazolyl)benzene, CAS #3073-87-8.

BBOT: 2,5-bis(5-tert-butylbenzoxazol-2-yl)thiophene, CAS #7128-64-5.

TPB: 1,1,4,4-tetraphenyl-1,3-butadiene, CAS #1450-63-1.

DPA: 9,10-diphenylanthracene, CAS #1499-10-1.

Coumarin 510: 2,3,6,7-tetrahydro-10-(3-pyridinyl)-1H, 5H,11H-[1]benzopyrano[6,7,8-ij]quinolizin-11-one, CAS #: 87349-92-6.

Coumarin 540A: 2,3,6,7-tetrahydro-9-(trifluoromethyl)-1H,5H,11H-[1]benzopyrano(6,7,8-ij)quinolizin-11-one; CAS #: 53518-18-6.

Coumarin 515: 3-(2-Nmethylbenzimidazolyl)-7-N,N-diethylaminocoumarin, CAS #41044-12-6.

Coumarin 7: 3-(2-benzimidazolyl)-7-(diethylamino)coumarin, CAS #27425-55-4.

DPH: 1,6-diphenyl-1,3,5-hexatriene, CAS #1720-32-7.

BBQ: 7H-benzimidazo(2,1-a)benz(de)isoquinoline-7-one, CAS #23749-58-8.

Scintillatable Metal-Organic Framework Particle Compositions Methods of Using Thereof Compositions containing scintillatable metal-organic framework particles are described herein. In one non-limiting instance, the composition includes:

a plurality of scintillatable metal-organic framework particles;

wherein at least a primary fluorescent additive and optionally a secondary fluorescent additive are associated with the metal-organic framework particles; and wherein the metal-organic framework particles comprise a metal ion and a polyaromatic organic linker compound.

In some instances, the composition further comprises a solvent in which the plurality of scintillatable metal-organic framework particles are disposed. In some instances, the solvent is an aqueous solvent or the solvent is water. When the solvent is an aqueous solvent, water may be present at a concentration from about 0.1 wt % to 99.5 wt % of the solvent. "Aqueous solvents" and "aqueous solutions" are generally used herein interchangeably and refer water or a combination of water and a water-miscible organic solvent, typically a water-miscible polar organic solvent. In yet other instances, the plurality of scintillatable metal-organic framework particles can be present in the composition from about 0.1 mg/mL to about 30 mg/mL of the solvent, when present. In still other instances, the solvent may include one or more organic solvent(s), such as dimethylformamide (DMF), ethanol, methanol, or chloroform, or a combination thereof.

In some instances, the primary fluorescent additive is PPD, PTP, PBD, PPO, a-NPD, pyrene, BBD, BPO, PBO, PBBO, O415, O408, DAT, BIBUQ, or BPBD, or a derivative of any one of the foregoing primary fluorescent additives, or a combination of any two or more of the foregoing primary fluorescent additives or derivatives thereof.

In some instances, the secondary fluorescent additive is α-NPO, BBO, DPS, POPOP, bis-MSB, DM-POPOP, BBOT, TPB, 9,10-diphenylanthracene (DPA), Coumarin 510, Coumarin 540A, Coumarin 515, Coumarin 7, DPH, or BBQ, or a derivative of any one of the foregoing secondary fluorescent additives, or a combination of any two or more of the foregoing secondary fluorescent additives.

In some instances, dopants such as the primary and secondary fluorescent additives have rod-like molecular structures which can enter the pores of the metal organic framework along their molecular short axis. Incorporating fluorescent additives having a rod-like molecular structure in the MOFs can result an in orientational alignment that provides some degree of intrinsic order in three dimensions. Doping pores of the scintillatable metal-organic framework particles can be achieved, for example, by preparing a solution of the primary and optional secondary fluorescent additives in suitable solvent, such as an organic solvent, and forming a mixture of the solution and the metal organic framework particles to allow the additives to enter pores of the MOFs and become encapsulated therein. The mixtures formed may be allowed to sit for a suitable period of time to ensure encapsulation of the additives in the pores of the MOF, such as for at least one day to up to one week, and any time disclosed within this range. Such additive solutions can have the primary and secondary fluorescent additives at independent concentrations of at least about 5 mg·mL$^{-1}$, 15 mg·mL$^{-1}$, 15 mg·mL$^{-1}$, or 20 mg·mL$^{-1}$; or in a range of about 5 to about 20 mg·mL$^{-1}$, as well as sub-ranges or individual values contained within the range. In some instances, the additive solutions have a molar ratio of the primary fluorescent additive to the secondary fluorescent additive of about 10:1. In some instances, the additive solutions have a molar ratio of the primary fluorescent additive to the secondary fluorescent additive ranging from about 1:100 to about 100:1, about 1:90 to about 90:1, about 1:80 to about 80:1, about 1:70 to about 70:1, about 1:60 to about 60:1, about 1:50 to about 50:1, about 1:40 to about 40:1, about 1:30 to about 30:1, about 1:20 to about 20:1, about 1:10 to about 10:1, about 1:9 to about 9:1, about 1:8 to about 8:1, about 1:7 to about 7:1, about 1:6 to about 6:1, about 1:5 to about 5:1, about 1:4 to about 4:1, about 1:3 to about 3:1, or about 1:2 to about 2:1, as well as sub-ranges or individual values contained within the aforementioned ranges. In some cases, the solutions have a mass ratio of the primary fluorescent additive and the secondary fluorescent additive to the metal organic framework particles of about 10:1. In some cases, the solutions have a mass ratio of the primary fluorescent additive and the secondary fluorescent additive to the metal organic framework particles ranging from about 1:100 to about 100:1, about 1:90 to about 90:1, about 1:80 to about 80:1, about 1:70 to about 70:1, about 1:60 to about 60:1, about 1:50 to about 50:1, about 1:40 to about 40:1, about 1:30 to about 30:1, about 1:20 to about 20:1, about 1:10 to about 10:1, about 1:9 to about 9:1, about 1:8 to about 8:1, about 1:7 to about 7:1, about 1:6 to about 6:1, about 1:5 to about 5:1, about 1:4 to about 4:1, about 1:3 to about 3:1, or about 1:2 to about 2:1, as well as sub-ranges or individual values contained within the aforementioned ranges.

In some instances, the metal-organic framework particles contain pores having an average size of about 10 to about 50 Å, about 10 to about 45 Å, about 10 to about 40 Å, about 10 to about 35 Å, about 10 to about 30 Å, about 10 to about 25 Å, about 10 to about 20 Å, about 10 to about 15 Å, or about 10 Å, as well as sub-ranges or individual sizes disclosed within the aforementioned ranges.

In some instances, the metal-organic framework particles contain pores having an average size of less than about 50 Å and greater than about 5 Å, less than about 45 Å and greater than about 5 Å, less than about 40 Å and greater than about 5 Å, less than about 35 Å and greater than about 5 Å, less than about 30 Å and greater than about 5 Å, less than about 25 Å and greater than about 5 Å, less than about 20 Å and greater than about 5 Å, less than about 15 Å and greater than about 5 Å, or less than about 10 Å and greater than about 5 Å.

In some instances, the metal ion is a Zr, Fe, Cr, Al, Eu, Cu, Zn, Ni, Mn, Ag, Ca, Pb, Tb, Sr, Yb, Gd, Sm, Ce, or Hf ion. The metal can be present in the particles from about 15 wt % to about 35 wt %.

In some instances, the polyaromatic organic linker compound includes a functional group, such as terphenyl (e.g., p-Terphenyl), stilbene (e.g., trans-stilbene), 1,4-phenylene-2,2'-bisoxazole, stilbene, dimethyl POPOP, PPD, PPO, or DPA, or a derivative thereof.

In some instances, the metal-organic framework particles comprise Universitetet i Oslo (UiO) metal-organic framework particles, such as UiO-64, UiO-66, UiO-67, UiO-68, or UiO-69, or a combination thereof. For instance, UiO metal-organic framework particles can be formed by the methods disclosed in Ru, et al., in Ecotoxicology and Environmental Safety, Volume 208, 15 Jan. 2021, 111577.

In some instances, the composition is in the form of a solid or a liquid. In some instances, the solid is in a powder form. In some instances, the composition is in the form of a liquid.

Methods of Quantifying Radioisotopes

Methods for quantifying a radioisotope using the compositions described above are also described herein. In one non-limiting example, a method includes the steps of:

(i) exposing a composition to a radioisotope; and
  (ii) quantifying luminescence of the scintillation signals emitted from the composition;
  wherein the radioisotope is selected from the group consisting of a free radioisotope, a radioisotope bound to a radioligand, and combinations thereof.

The composition is as described in above in the section entitled Scintillatable Metal-Organic Framework Particle Compositions Methods of Using Thereof".

In some instances, the composition in step (i) includes a solvent. Optionally, the radioisotope is also present in the same solvent or a differ liquid environment. For instance, the radioisotope can be added to a liquid composition including a solvent and a plurality of scintillatable metal-organic framework particles as described above to form a mixture and step (i) occurs within the mixture. In some cases, the solvent is an aqueous solvent or the solvent is water.

The methods described herein can be used for quantitative analysis of radioisotopes. Such radioisotopes can include, without limitation, alpha particle emitting radioisotopes, beta particle emitting radioisotopes, and/or gamma particle emitting radioisotopes. In some instances, such radioisotopes are present in a solvent, such as water, and in step (1) of methods the radioisotope is present in the solvent.

In some instances, step (ii) of the method described can be carried out by measuring the scintillation signals at a selected wavelength or at a selected plurality of wavelengths using a scintillation counter. The selected wavelength or selected plurality of wavelengths will depend on the emission wavelengths of the scintillation events produced by the scintillatable metal-organic framework particles, the primary fluorescent additive, and the secondary fluorescent additive in the composition when exposed to the radioisotope.

In some instances of the method, a further step (iii) involves calculating a quantity of the radioisotope exposed to the composition. Known methods of quantifying and determining the concentration of radioisotope based on the scintillation produced by the composition, when exposed to the radioisotope, can be used. In some instances, quantifying and determining the concentration of radioisotope may involve use of standard additions or single calibrations based on a radioisotope having a known concentration in order to validate/confirm method.

In some instances, the scintillation signals produced by the radioisotope, during step (ii), exhibit a linear function within a range from about 0 to about 150 nCi·mL$^{-1}$. In some instances, the limit of detection (LOD) of the method for a radioisotope is as low as about 0.5 nCi·mL$^{-1}$.

The metal-organic framework (MOF) particles of the composition are suspensible in a solvent, such as water. Such MOF particles can detect radioisotopes and radioisotope labeled species, which may be in aqueous solution. The MOF detection platform, as described herein can be used in a traditional SSC/LSC format or it can be chemically modified to enable molecularly selective and specific detection using scintillation proximity assay.

The compositions and methods described herein can be used for various applications, such as biological/biochemical applications, metabolism studies, drug screening, identification and functional assays, cell-binding assays, environmental tracing, in vivo and in vitro imaging, and nuclear waste management and proliferation applications. There are numerous applications where it is desirable to detect radioisotopes directly in a solvent, such as in water or aqueous solutions. The ability to measure directly in a solvent enables direct and time resolved measurements. Further, purification of radioisotopes from aqueous solutions is generally straight forward, enabling researchers to maximize the value of the radioisotopes used in analyses.

The method described can be used to quantify radiopharmaceuticals, which represent a large and growing market for radioisotope detection. Though radiopharmaceutical describes a broad range of research related activities, several key areas of radiopharmaceutical growth, as well as a more traditional areas of pharmaceutical chemistry and drug discovery can benefit from the methods described using the metal-organic framework (MOF) scintillators.

For instance, the increased need for novel and selective cancer therapeutics has led to the investigation of novel radioisotopes for tumor targeting. Whereas traditional beta (with some gamma) emitters have been used for decades in therapeutic and imaging applications, the longer decay lengths of these isotopes can lead to tissue damage in the bordering tissue. Furthermore, many are not selective to specific cells. The advent of radiolabeled drugs, that bind specifically to receptors that are highly expressed in tumor cells has further expanded the radiopharmaceutical paradigm but identification of new drugs and new radioisotopes is needed to advance this further.

In some cases, the scintillatable MOF particles may be used for quantitative analysis of low-energy β-emitting radioisotopes. For example:

TABLE 1

| Exemplary Radioisotopes and Decay Modes | |
| --- | --- |
| Radioisotope | Decay Mode |
| $^{111}$In | Weak Gamma, electron capture |
| $^{68}$Ga | beta, EC, weak gamma |
| $^{177}$Lu | beta, gamma |
| $^{225}$Ac | Alpha, gamma |

The scintillatable MOF particles described typically exhibit exceptional stability to various solvents and environments, surfaces that are conducive to chemical modification, and dispersibility in water or aqueous solvents.

In some instances, the methods described can be used for biocompatible scintillation analyses for biochemical and biomedical research. These can include, without limitation, metabolism research and cell-binding assays.

In some instances, the radioisotopes quantified by the method are in the form of radiopharmaceuticals.

In still other instances, the methods described can be used for radioisotope tracing.

Advantages of the disclosed scintillatable MOFs and the method of detecting radioisotopes can include, for example, higher scintillation response, stability in aqueous, organic, or mixed solvents, continuous monitoring for direct, time-resolved measurements, and maximizing value of radioisotopes through purification from aqueous solutions.

To improve the detection efficiency, solid scintillatable MOFs can be fabricated into three-dimensional materials with nanometer and micron dimension enabling homogeneous dispersion of the scintillatable MOF particles in one or more solvents. Certain tunable features of the scintillatable MOF particles can include: i) absorption of β-emission, ii) energy transfer scintillant fluorophores, iii) stable and suspensible physical structure and size, and iv) a surface that enables chemical modification. The selection and modification of these features can be carried out by way of synthesis and materials selected to form the scintillatable MOF particles.

In one embodiment, a zirconium metal-organic framework, namely scintillating UiO 68, is provided to measure low-energy β emitters in aqueous media. UiO-68 compositions are composed of Zr oxo clusters containing Zr (zirconium) and O (oxygen) 2. UiO-68 is one of the UiO series MOFs, UiO refers to Universitetet i Oslo (University of Oslo).

As under an elevated concentration of $^{3}$H-acetate, the distance between UiO68 and $^{3}$H-acetate decreases so the detectability of $^{3}$H-acetate increases, and the scintillating signal (CPM) is a linear function of added $^{3}$H-acetate. The scintillating UiO 68 is homogeneously constructed from Zr metal clusters connected with a luminescent linker, 9,10-diphenylanthracene, to build the crystalline mesoporous nanostructure. The scintillating properties of UiO68 originate from Zr clusters functioning as energy absorbers of emission from proximal β particles, and subsequently emitting photoelectrons that excite nearby linkers that emit visible light upon relaxation. The limit of detection using UiO68 was 10 nCi/mL for $^{3}$H. In addition to being stable in aqueous solutions, the scintillating UiO68 are also stable and functional in a wide range of organic and aqueous-organic systems, such as DMF, ethanol, methanol, chloroform.

Figure 2A:
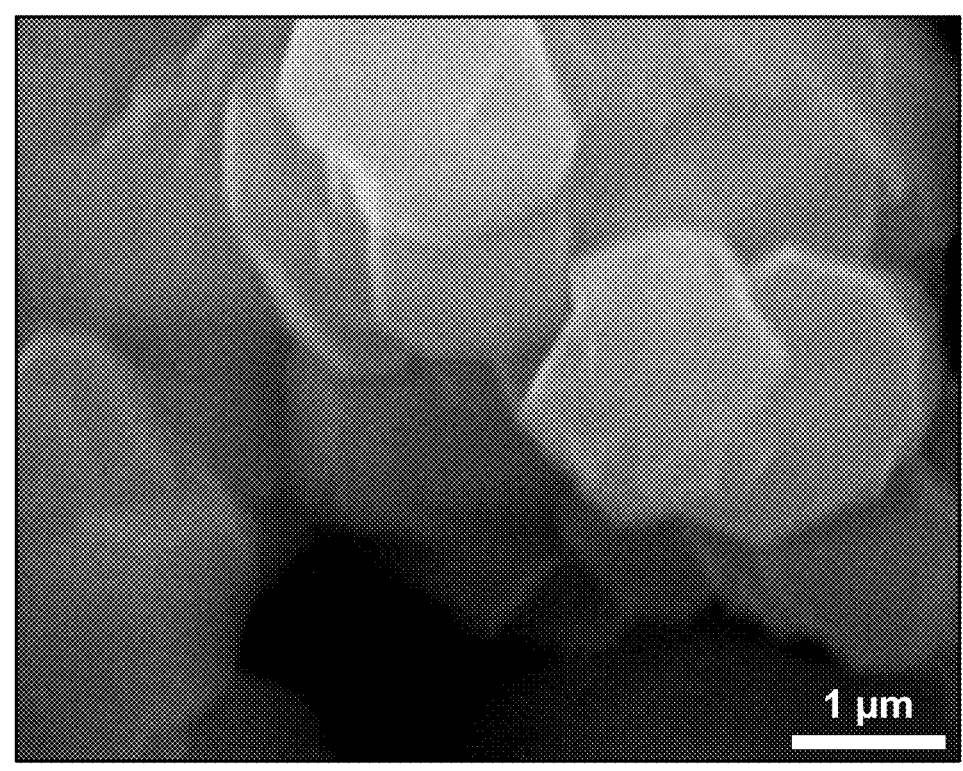
FIGS. 2A-2B. Characterization of Zr-MOF particles.
Figure 2B:
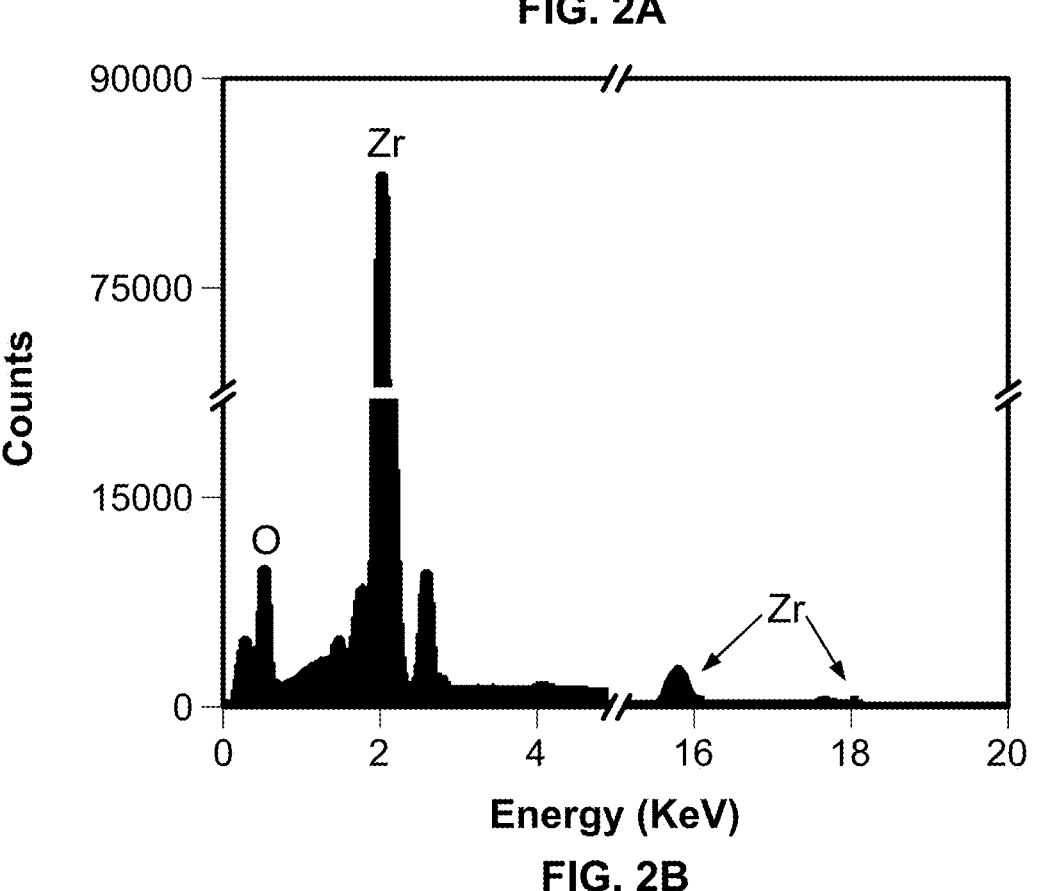
Figure 3:
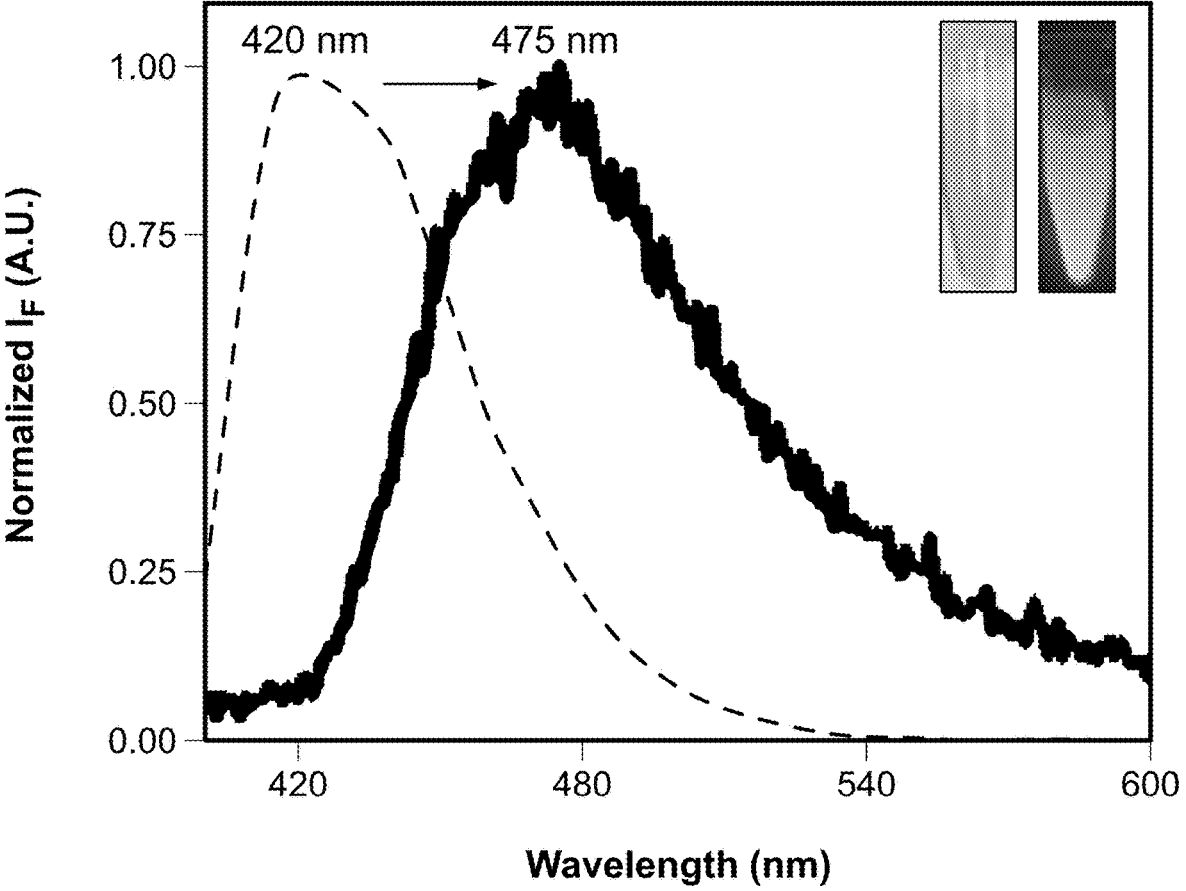
FIG. 3 Zr-MOF characterization. The normalized fluorescence spectra for the free organic linker 9,10-diphenylanthracene (indicated as dash or broken line) and linker when prepared in Zr-MOFs (indicated as a solid line) with excitation at 390 nm. The shift in fluorescence emission of the solid line is characteristic of successful incorporation of organic linker in UiO-68 Zr-MOF particle. Inset shows optical images of Zr-MOF particles under white light (left) and 365 nm UV radiation (right).
Figure 4:
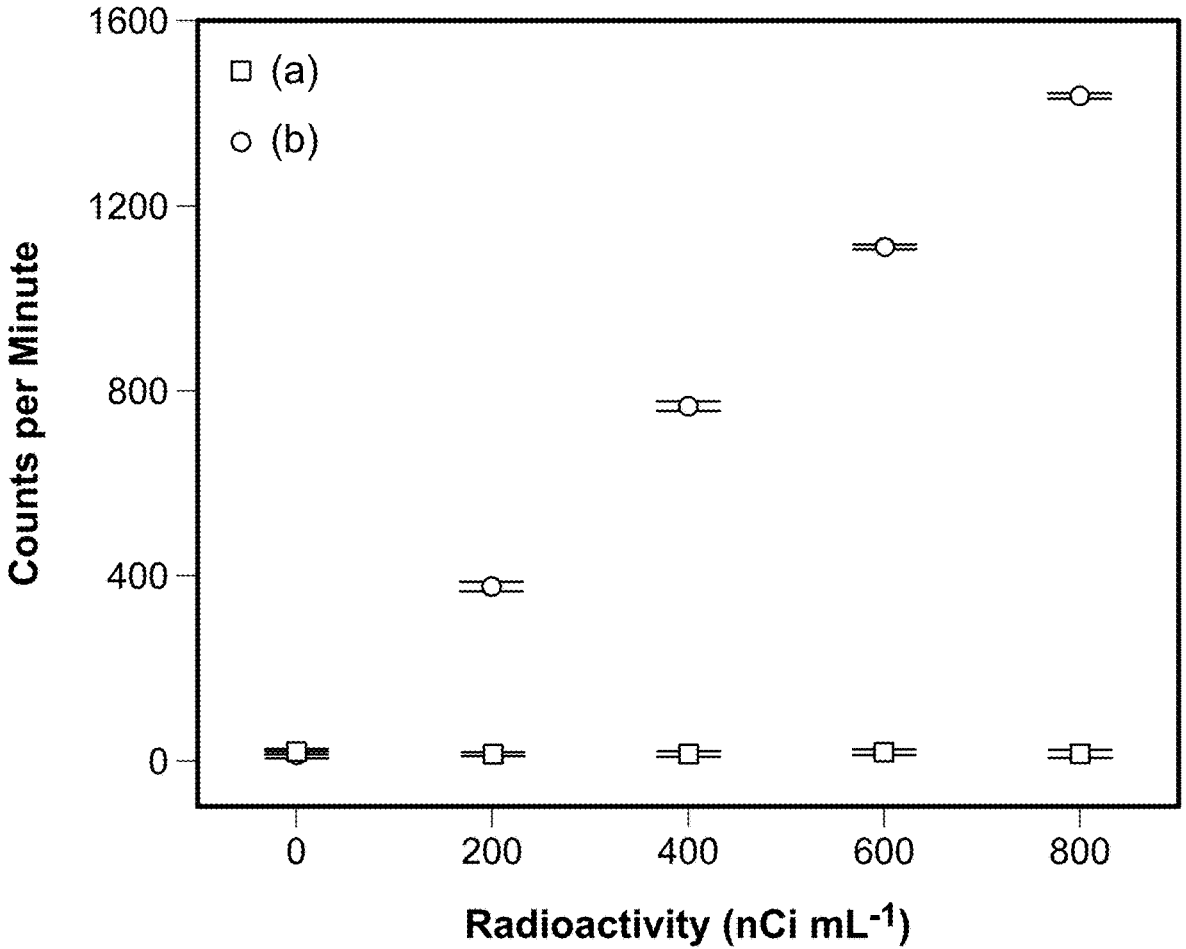
FIG. 4 provides a functional demonstration of scintillating Zr-MOF particles. The scintillation response of (a) aqueous solution (negative control), shown as squares and (b) Zr-MOF particles, prepared with 9,10-diphenylanthracene linker (shown as red circles), in aqueous solution after incubating with 200, 400, 600, 800 nanocuries (nCi) mL$^{-1}$ tritiated acetate for 30 mins. The amount of Zr-MOF particles was 0.25 mg mL$^{-1}$ for a single measurement. The error bars represent the standard deviation of three independent measurements. Limit of detection (LOD) for tritiated acetate: 10 nCi mL$^{-1}$.
Figure 5A:
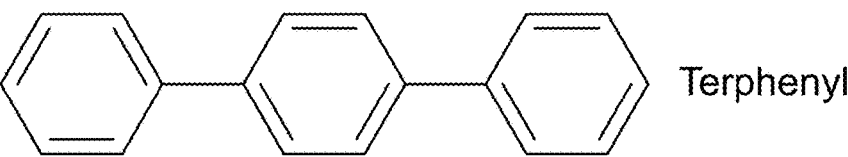
FIG. 5A shows core chemical structures of prolinkers: terphenyl, trans-stilbene, 1,4-phenylene-2,2'-bisoxazole, PPD and PPO. Prolinkers are subsequently functionalized to provide compounds that are capable of forming MOFs.
Figure 5A:
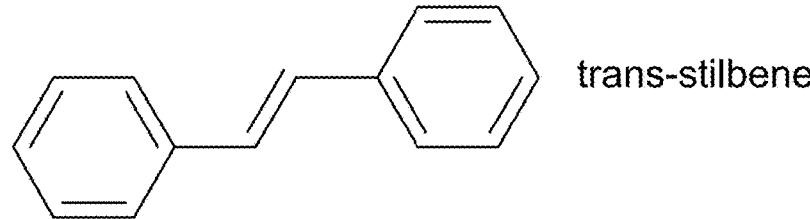
Figure 10:
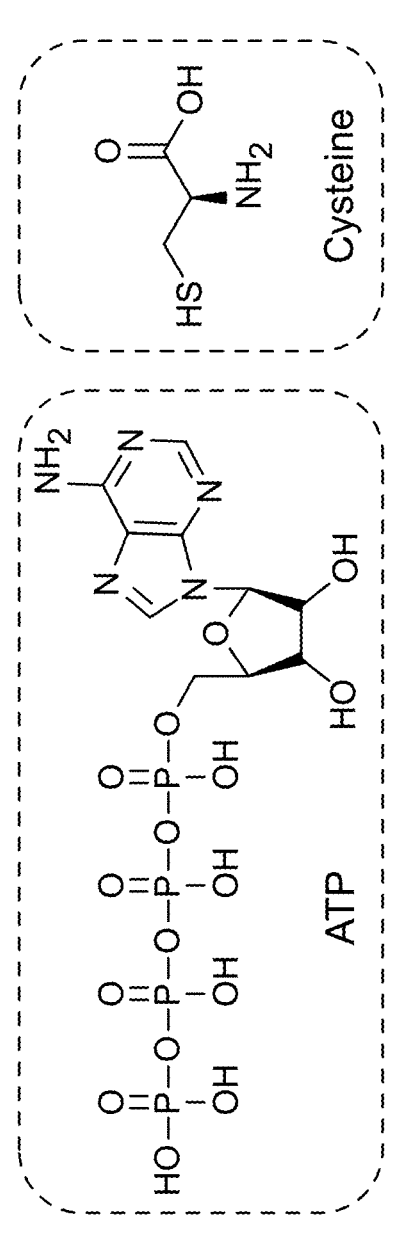
FIG. 10 lists some common low energy β emitters with nonradioactive counterparts found ubiquitously in natural molecules, have the advantage to replicate the molecular interaction in more native way and are commonly used to label organic molecules for biological, biochemical and environmental applications.
Figure 11:
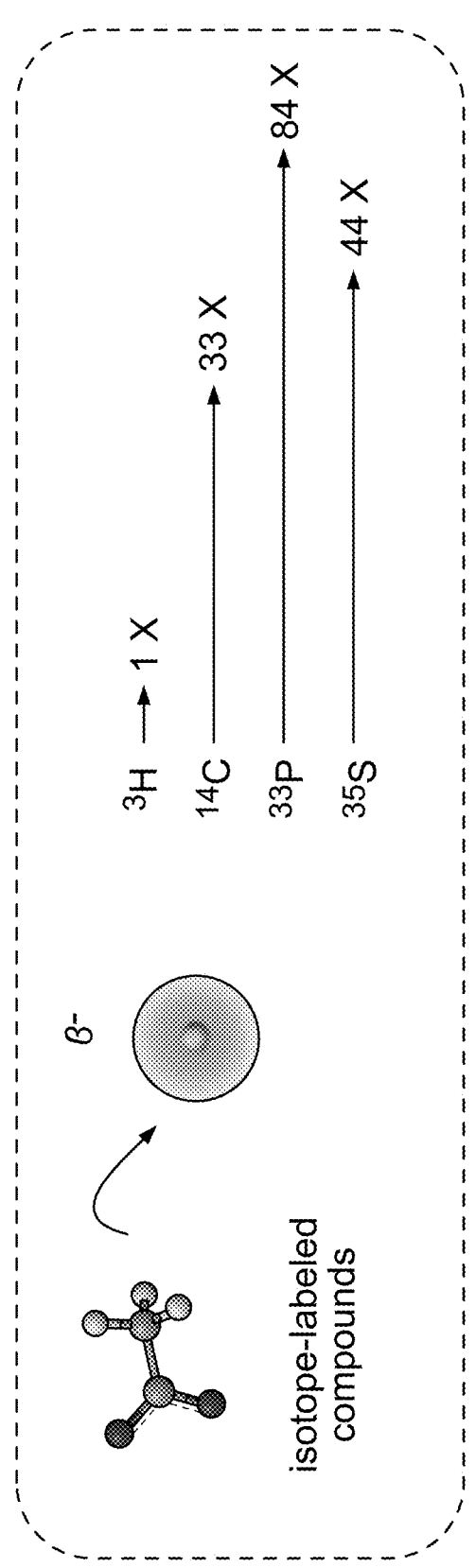
FIG. 11 illustrates the differences in penetration depth of low energy β emitters and mean path length of radionuclides in water.

In addition to being stable in aqueous solutions, the scintillatable MOF particles described are also stable and functional in a wide range of organic and aqueous-organic systems and uniquely allow control of excitonic transport within the particle in order to avoid energy dissipation during exciton transfer, making it possible to achieve an ultrasensitive platform to sense β emitters in biological systems. In one non-limiting example, scintillating Zr-MOFs have mesoporous nanostructures which are composed of Zr metal clusters and organic luminescent linkers, such as 9,10-diphenylanthracene. An exemplary scheme for the invention is provided in FIGS. 1, FIG. 12A and FIG. 12B. Successful fabrication of UiO-68 Zr-MOF scintillation particles is supported in FIGS. 2A, 2B and 3. Demonstration of the proposed invention, Zr-MOF scintillation particles, functioning as low-energy beta (0) emitter sensors can be found in FIG. 4.

Zr metal in conjunction with a broad spectrum of exemplary organic luminescent linkers (L) shown in FIGS. 5A, 5B, 5C and 7 have been used to prepare an array of MOF scintillating particles ranging in size from on the order of 100 nm diameter up to on the order of 10 μm diameter.

Figure 8:
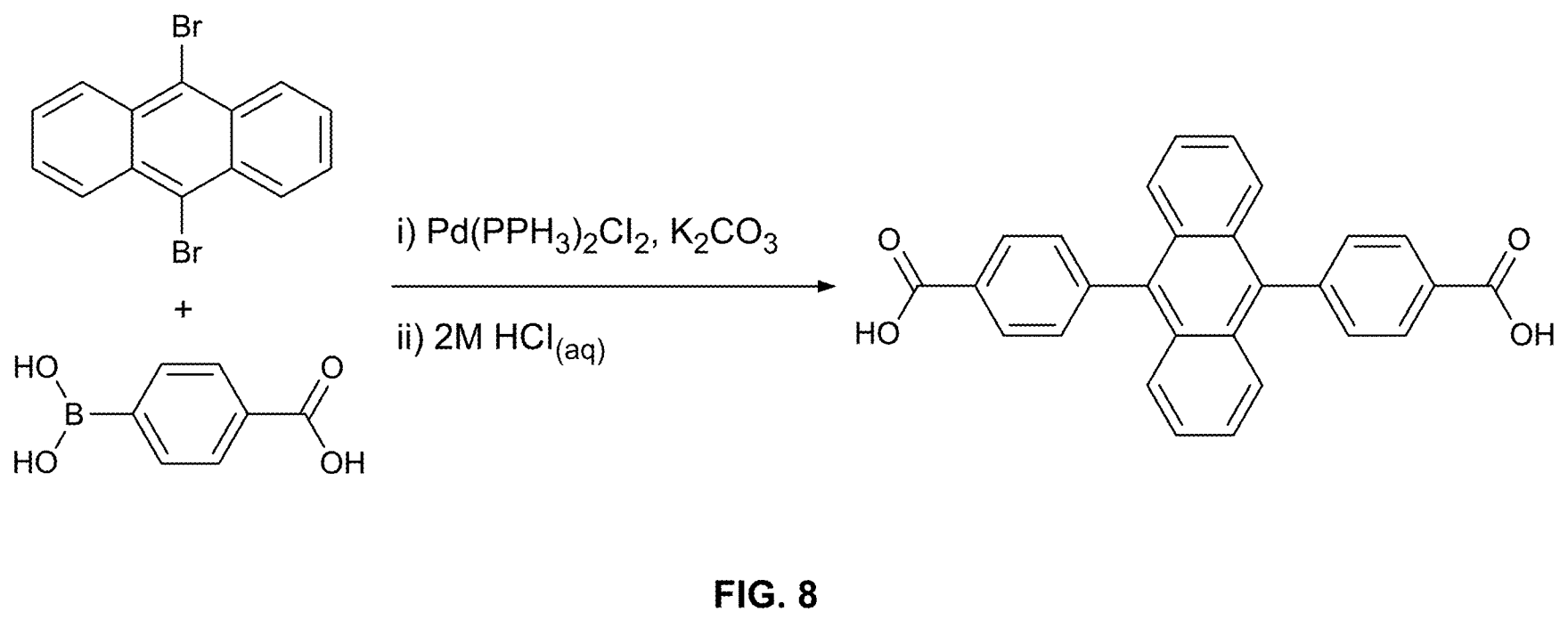
Figures 12A, 12B:
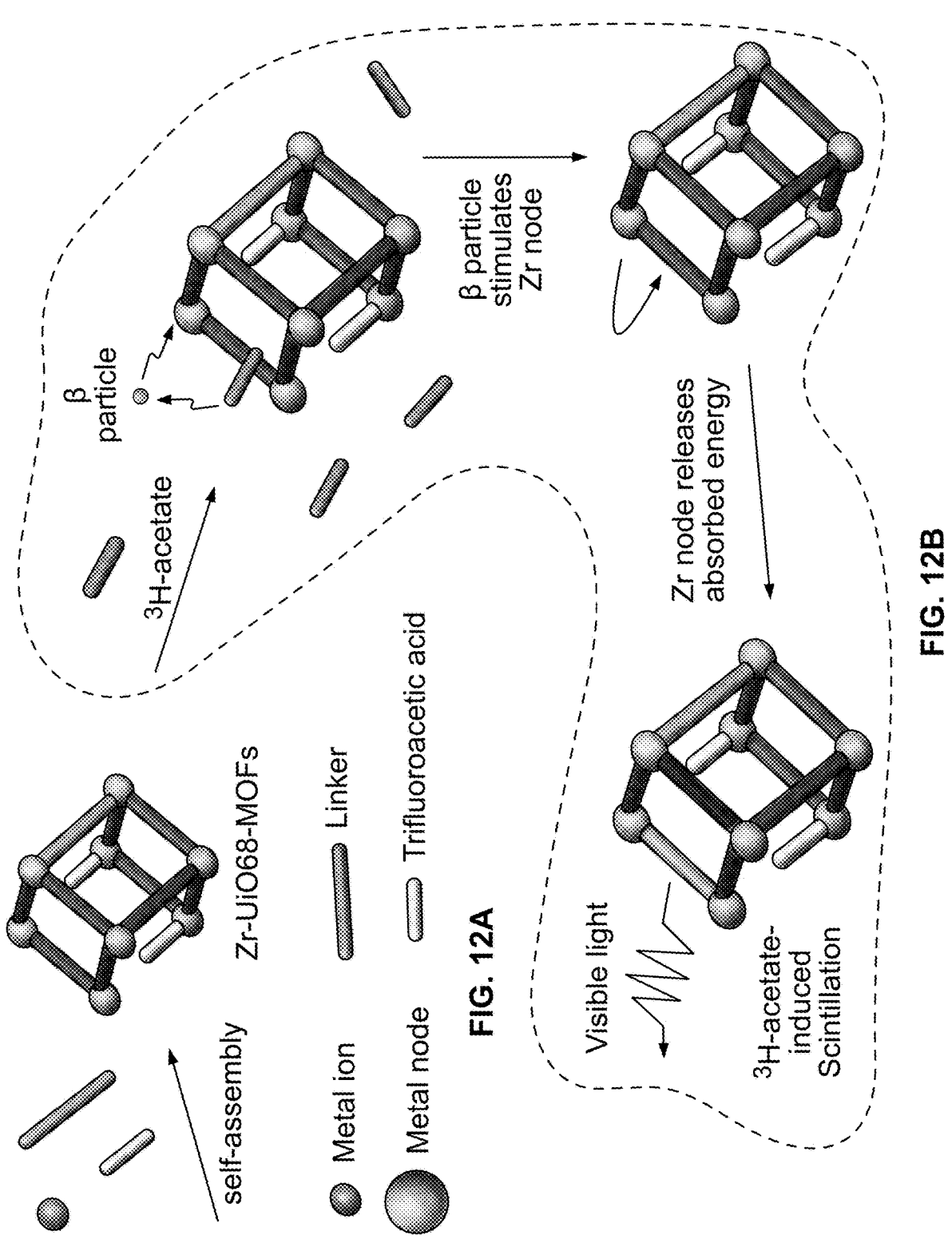
FIGS. 12A-12B. Schematic illustration of (FIG. 12A) synthesis of scintillating metal-organic frameworks (MOFs) via a hydrothermal reaction.

In some embodiments, Zr-UiO68-MOFs may be prepared with the dicarboxylated derivative of DPA as the organic component, as shown in, example FIG. 8. FIG. 12A in panel A, illustrates the preparation of luminescent MOFs, denoted as Zr-UiO68-MOFs, by self-assembly of Zr ions/nodes/oxoclusters, acid modulators, and organic linkers. DPA was selected primarily because of its efficient fluorescence, featuring a near-unity photoluminescence quantum yield and emission wavelength that is well-suited for detection with commercially available scintillation counters. Without wishing to be limited by any particular theory, along with the exceptional stability attained by Zr-MOFs in aqueous systems, the Zr-oxoclusters are efficient at absorbing ionizing radiation and for energy transfer to nearby organic fluorophores. Zr-oxoclusters also provide exposed active sites that enable surface functionalization to tailor the surface chemistry for future applications, e.g. scintillation proximity assays, if desired.

The disclosed methods can be further understood through the following numbered paragraphs.

Paragraph 1. A composition comprising:

a plurality of scintillatable metal-organic framework particles;

wherein at least a primary fluorescent additive and optionally a secondary fluorescent additive are associated with the metal-organic framework particles; and wherein the metal-organic framework particles comprise a metal ion and a polyaromatic organic linker compound.

Paragraph 2. The composition of paragraph 1, wherein the composition further comprises a solvent in which the plurality of scintillatable metal-organic framework particles are disposed.

Paragraph 3. The composition of paragraph 2, wherein the solvent is an aqueous solvent or the solvent is water.

Paragraph 4. The composition of paragraph 2, wherein the solvent comprises an organic solvent.

Paragraph 5. The composition of paragraph 4, wherein the organic solvent is selected from the group consisting of dimethylformamide (DMF), ethanol, methanol, chloroform, and a combination of any two or more of the foregoing organic solvents.

Paragraph 6. The composition of paragraph 3, wherein water in the aqueous solvent is present at a concentration from about 0.1 wt % to 99.5 wt %.

Paragraph 7. The composition of any one of paragraphs 1-6, wherein the primary fluorescent additive is selected from the group consisting of PPD, PTP, PBD, PPO, a-NPD, pyrene, BBD, BPO, PBO, PBBO, O415, O408, DAT, BIBUQ, BPBD a derivative of any one of the foregoing primary fluorescent additives, and a combination of any two or more of the foregoing primary fluorescent additives.

Paragraph 8. The composition of any one of paragraphs 1-7, wherein the secondary fluorescent additive is selected from the group consisting of a-NPO, BBO, DPS, POPOP, bis-MSB, DM-POPOP, BBOT, TPB, 9,10-diphenylanthracene (DPA), Coumarin 510, Coumarin 540A, Coumarin 515, Coumarin 7, DPH, BBQ, a derivative of any one of the foregoing secondary fluorescent additives, and a mixture of any two or more of the foregoing secondary fluorescent additives.

Paragraph 9. The composition of any one of paragraphs 1-8, wherein the metal-organic framework particles contain pores having an average size of about 10 to about 50 Å, about 10 to about 45 Å, about 10 to about 40 Å, about 10 to about 35 Å, about 10 to about 30 Å, about 10 to about 25 Å, about 10 to about 20 Å, or about 10 to about 15 Å.

Paragraph 10. The composition of any one of paragraphs 1-8, wherein the metal-organic framework particles contain pores having an average size of less than about 50 Å, less than about 45 Å, less than about 40 Å, less than about 35 Å, less than about 30 Å, less than about 25 Å, less than about 20 Å, less than about 15 Å, or less than about 10 Å and greater than about 5 Å.

Paragraph 11. The composition of any one of paragraphs 9-10, wherein the at least primary fluorescent additive and optional secondary fluorescent additive are encapsulated within the pores of the metal-organic framework particles.

Paragraph 12. The composition of any one of paragraphs 1-11, wherein the metal ion is selected from the group consisting of Zr, Fe, Cr, Al, Eu, Cu, Zn, Ni, Mn, Ag, Ca, Pb, Tb, Sr, Yb, Gd, Sm, Ce, and Hf ions.

Paragraph 13. The composition of any one of paragraphs 1-12, wherein the metal is present in the particles from about 15 wt % to about 35 wt %.

Paragraph 14. The composition of any one of paragraph 1-13, wherein the polyaromatic organic linker compound comprises a functional group selected from the group consisting of terphenyl (e.g., p-Terphenyl), stilbene (e.g., trans-stilbene), 1,4-phenylene-2,2'-bisoxazole, stilbene, dimethyl POPOP, PPD, PPO, DPA, and derivatives thereof.

Paragraph 15. The composition of paragraph 2, wherein the plurality of scintillatable metal-organic framework particles are present in the composition from about 0.1 mg/mL to about 30 mg/mL.

Paragraph 16. The composition of paragraphs 1-15, wherein the metal-organic framework particles comprise Universitetet i Oslo (UiO) metal-organic framework particles selected from the group consisting of UiO-64, UiO-66, UiO-67, UiO-68, and UiO-69, or a combination thereof.

Paragraph 17. The composition of paragraph 1, wherein the composition is in the form of a solid or a liquid.

Paragraph 18. A method of quantifying a radioisotope, the method comprising:

(i) exposing the composition of any one of paragraphs 1 to 17 to a radioisotope; and (ii) quantifying luminescence of the scintillation signals emitted from the composition;

wherein the radioisotope is selected from the group consisting of a free radioisotope, a radioisotope bound to a radioligand, and combinations thereof.

Paragraph 19. The method of paragraph 18, wherein the radioisotope is a beta particle emitting radioisotope selected from the group consisting of $^3$H, $^{14}$C, $^{22}$Na, $^{33}$P, $^{35}$S, $^{45}$Ca, $^{125}$I, $^{32}$P, $^{235}$U, $^{225}$Ac and $^{86}$Rb.

Paragraph 20. The method of any one of paragraphs 18-19, wherein the radioisotope is a gamma photon energy emitting radioisotope.

Paragraph 21. The method of paragraph 20, wherein the gamma photon energy emitting radioisotope is $^{125}$I.

Paragraph 22. The method of any one of paragraphs 18 to 21, wherein the radioisotope is an alpha particle emitting radioisotope selected from the group consisting of $^{209}$Bi, $^{211}$Bi, $^{212}$Bi, $^{213}$Bi, $^{210}$Po, $^{211}$Po, $^{212}$Po, $^{214}$Po, $^{215}$Po, $^{216}$Po, $^{218}$Po, $^{215}$At, $^{217}$At, $^{218}$At, $^{218}$Rn, $^{219}$Rn, $^{220}$Rn, $^{222}$Rn, $^{226}$Rn, $^{221}$Fr, $^{223}$Ra, $^{224}$Ra, $^{226}$Ra, $^{225}$Ac, $^{227}$Ac, $^{227}$Th, $^{228}$Th, $^{229}$Th, $^{230}$Th, $^{232}$Th, $^{231}$Pa, $^{233}$U, $^{234}$U, $^{235}$U, $^{236}$U, $^{238}$U, $^{237}$Np, $^{238}$P, $^{239}$Pu, $^{240}$Pu, $^{244}$Pu, $^{241}$Am, $^{244}$Cm, $^{245}$Cm, $^{248}$Cm, $^{249}$Cf, and $^{252}$Cf.

Paragraph 23. The method of any one of paragraphs 18 through 22, further comprising (iii) calculating a quantity of the radioisotope exposed to the composition.

Paragraph 24. The method of paragraph 23, wherein step (ii) comprises measuring the scintillation signals at a selected wavelength or at a selected plurality of wavelengths using a scintillation counter.

Paragraph 25. The method of any one of paragraphs 18-24, wherein the composition in step (i) further comprises a solvent and the radioisotope is present in the solvent.

Paragraph 26. The method of paragraph 25, wherein the solvent is an aqueous solvent or the solvent is water.

Paragraph 27. A composition, comprising: a plurality of scintillatable metal-organic framework particles; and a liquid in which the radioisotope and the particles are disposed; wherein the metal-organic framework particles comprise a metal (specifically, a metal ion) and a polyaromatic organic linker compound.

Paragraph 28. The composition of paragraph 27, further comprising a primary fluorescent additive.

Paragraph 29. The composition of paragraph 28, wherein the primary fluorescent additive is selected from the group consisting of PPD, PTP, PBD, PPO, a-NPD, pyrene, BBD, BPO, PBO, PBBO, O415, O408, DAT, BIBUQ, BPBD a derivative of any one of the foregoing primary fluorescent additives, and a combination of any two or more of the foregoing primary fluorescent additives.

Paragraph 30. The composition of paragraph 28, wherein the mixture further comprises a secondary fluorescent additive.

Paragraph 31. The composition of paragraph 30, wherein the secondary fluorescent additive is selected from the group consisting of a-NPO, BBO, DPS, POPOP, bis-MSB, DM-POPOP, BBOT, TPB, 9,10-diphenylanthracene (DPA), Coumarin 510, Coumarin 540A, Coumarin 515, Coumarin 7, DPH, BBQ, a derivative of any one of the foregoing secondary fluorescent additives, and a mixture of any two or more of the foregoing secondary fluorescent additives.

Paragraph 32. The composition of any one of preceding paragraphs 27-31, wherein the metal is selected from the group consisting of Zr, Fe, Cr, Al, Eu, Cu, Zn, Ni, Mn, Ag, Ca, Pb, Tb, Sr, Yb, Gd, Sm, Ce, and Hf.

Paragraph 33. The composition of any one of preceding paragraphs 27-32, wherein the linker compound comprises a functional group selected from the group consisting of terphenyl (e.g., p-Terphenyl), stilbene (e.g., trans-stilbene), 1,4-phenylene-2,2'-bisoxazole, stilbene, dimethyl POPOP, PPD, PPO, DPA, and derivatives thereof.

Paragraph 34. A method of quantifying a radioisotope in a liquid, the method comprising: forming a mixture comprising a radioisotope, a plurality of scintillatable metalorganic framework particles, and a liquid; wherein the metalorganic framework particles comprise a metal and a polyaromatic organic linker compound; and quantifying luminescence of a predefined wavelength, or a predefined plurality of wavelengths, that is emitted from the mixture wherein the radioisotope is selected from the group consisting of a free radioisotope, a radioisotope bound to a radioligand, and a combination thereof.

EXAMPLES

The following examples are provided solely to illustrate the present invention and are not intended to limit the scope of the invention, described herein.

Example 1. Method of Preparing Zirconium Metal Organic Framework (MOF) Particles with 9,10 Diphenylanthracene Linker Zirconium MOF particles having polyaromatic organic linkers 1, 2, 3 or 4 (chemical structure shown in FIG. 5C) were prepared as per the protocol described by Wang et al. in https://doi.org/10.1021/ja500671h. ZrCl$_4$ (11.5 mg, 0.05 mmol), H2L (H2L is an abbreviation to show 2COOH (carboxylic) terminal groups of the linker (L) as H2) chosen core linker in the lists as L (linker 1-4, 0.05 mmol), and trifluoroacetic acid (50 μL, 0.8 mmol) were dispersed in dimethylformamide (DMF) (10 mL), sealed in a vial, and placed in an oil bath. The temperature was kept at 100° C. for 48 hours. After cooling to room temperature, the resulting solid was isolated by centrifugation, and washed with DMF and methanol repeatedly before being dried under vacuum. Linkers 1-5 are provided in FIG. 5C.

Zirconium metal organic framework particles having linker 5 (chemical structure provided in FIG. 5C) were prepared by a method adapted from Decker et al. (https://doi.org/10.1021/acs.chemmater.9b01383). ZrCl$_4$ (89 mg, 0.386 mmol), H$_2$L (linker 5, 1.315 mmol), and water (400 μL, 22 mmol) were dispersed in DMF (15 mL), sealed in a vial, and placed in an oil bath. The temperature was kept at 110° C. for 24 hours. After cooling to room temperature, the resulting solid was isolated by centrifugation, and washed with DMF and methanol repeatedly before being dried under vacuum.

Five organic luminescent linkers (L) that were both incorporated into scintillating MOF particles and characterized as low-energy β emission sensing particles are provided in FIG. 5C and characterization data are presented in FIG. 6. 'Source' column in FIG. 5C refers to how the various linkers were obtained for use in MOF particles. Linkers L1 and L2 were synthesized by inventors and linkers L3, L4 and L5 were purchased from commercial vendors (TCI America, Inc. and AbAChemScene, Inc.). The linkers are the following carboxylic acid derivatives:

Linker 1: 4,4'-(9,10-Anthracenediyl)bis[benzoic acid, cas #42824-53-3;

Linker 2: 4,4'-(2,1,3-Benzothiadiazole-4,7-diyl)bis[benzoic acid], cas #1581774-76-6;

Linker 3: 4,4'-(1,2-Ethenediyl)bis[benzoic acid], cas #100-31-2;

Linker 4: 2,6-Naphthalenedicarboxylic acid, cas #1141-38-4;

Linker 5: [1,1'-Biphenyl]-4,4'-dicarboxylic acid, cas #787-70-2.

In FIG. 6, the 'Linker in solution' column refers to the maximal emission wavelength for the linkers in solution, not incorporated in MOFs. The 'Incorporated in MOFs' column refers to the wavelength of maximal emission for the linkers once incorporated in MOFs; serving as evidence for successful preparation of MOFs. 'Scintillation response' column specifies the concentration of MOF particles, intensity of radioactivity by addition of tritium acetate, and the scintillation counts-per-minute (CPM). In the initial characterization, MOFs formed using linker 1 (L1) provided the highest scintillation response upon incubation with 2000 nCi/mL $^3$H-acetate. Linker 5 provided the second highest level, though it was approximately 3.5 fold less than MOFs formed with L1. MOFs prepared within linkers 2-5 yielded no or negligible scintillation response.

Example 2. Method of Preparing Hafnium MOF Particles

Hafnium MOF particles were prepared by the protocol as described by Wang et al. (https://doi.org/10.1021/ja500671h). HfCl$_4$ (16 mg, 0.05 mmol), H2L (21 mg, 0.05 mmol), and trifluoroacetic acid (50 µL, 0.8 mmol) were dispersed in DMF (10 mL), sealed in a vial, and placed in an oven. The temperature was kept at 100° C. for 48 hours. After cooling to room temperature, the resulting solid was isolated by centrifugation, and washed with DMF and methanol repeatedly before being dried under vacuum.

Example 3. Synthesis of Zr MOFs with DPA Linker

Zirconium chloride (ZrCl4, 0.05 mmol), fluorescent organic DPA linker (0.05 mmol) from Example 2, and trifluoroacetic acid (TFA, 62 µL, 0.8 mmol) were dispersed in N, N-dimethylformamide (DMF, 10 mL), sealed in a vial, and then sonicated until all reactants dissolved before placed in a preheated oil bath. The temperature was kept at 100° C. for 48 hr. After cooling to room temperature, the obtained MOFs were isolated by centrifugation, and washed with methanol and water repeatedly, then dispersed in water. The synthesized MOFs were stable in water and stored at room temperature.

Example 4. Characterization of Zr MOFs Prepared with DPA Linker

The Zr MOFs prepared in Example 3 with DPA linker were characterized. The fluorescent spectra of Zr-MOFs were measured under 365 nm excitation by using a PTI fluorometer using Felix software. The scintillating signals were obtained by Beckman LS 6000 IC liquid scintillation counter (LSC) by using a HDPE 7 mL scintillation vial with a screw cap. The Scanning Electron Microscope (SEM) imaging was performed by FEI Inspect S SEM operating at 30 kV equipped with a Thermo Noran System Six X-ray microanalysis system as an energy-dispersive X-ray spectrometer (EDS).

4-Carboxyphenylboronic acid (97%), 9,10-dibromoanthracene (98%), bovine serum albumin (BSA, ≥96%), potassium carbonate anhydrous (K2CO3, ≥99.9%), bis(triphenylphosphine) palladium (II) dichloride (PdCl¬2(PPh3)2, 98%), concentrated hydrochloric acid (HCl), zirconium chloride (ZrCl4, metals basis, ≥99.5%), sodium hydroxide, acetonitrile, ethanol, methanol, N, N-dimethylformamide (DMF), tetrahydrofuran (THF), hexane, trifluoroacetic acid (TFA, 98%) were purchased from Fisher Scientific and used as received. All the solvents used were HPLC grade. Tritium-labeled sodium acetate (3H-acetate, specific activity: 1.59 Ci·mmol-1) was obtained from Perkin Elmer (Waltham, MA). Ultrapure water (18.2 MΩ·cm) was used throughout the experiments.

The fluorescence spectrum of Zr-UiO68-MOFs was obtained in water and compared to the free DPA confirmed that the fluorescence was maintained in the MOF. The peak emission was red-shifted from 420 nm (for free dicarboxylated-DPA) to 475 nm, possibly due to a stabilized molecular configuration in the microenvironment of Zr-UiO68-MOFs without molecular aggregation—corresponding to lower energetic state(s) with preserved fluorescence emission.

Thermal gravimetric analysis, scanning electron microscopy, and energy dispersive x-ray spectroscopy were employed to validate the composition of Zr-UiO68-MOFs. It is known in the art that characteristic thermal decomposition occurs at approximately 560° C. Energy dispersive X-ray spectra contained the characteristic peaks for Zr metal oxo clusters. Additionally, SEM images revealed the expected octahedral topology with a mean particle diameter of ~1.5 µm; a microscale size targeted based on prior research that showed micron-sized MOFs provided a good compromise between stability and functionality for absorption high-energy ionizing radiation, yet remained sufficiently small to facilely disperse in aqueous solutions.

FIG. 12B, illustrates the processes by which Zr-UiO68-MOFs detect low-energy radioisotopes. A linear scintillation response as a function of mass concentration of Zr-UiO68-MOF SPs was observed for MOF mass concentrations up to 100 µg·mL$^{-1}$ when the radioactivity from $^3$H-acetate was fixed at 1000 nCi·mL$^{-1}$ (FIG. 9A). Similarly, a linear scintillation response as a function of increasing radioactivity of $^3$H-acetate was observed with a mass concentration of Zr-UiO68-MOFs fixed at 250 µg·mL$^{-1}$ (FIG. 9B). The limit of detection (LOD) was determined to be 11 nCi·mL$^{-1}$. Combined these data support the use of Zr-UiO68-MOFs for quantitative analysis of low-energy radionuclides directly in water in the most typical radioactivity levels used for biological and biochemical measurements.

To evaluate the stability of the Zr-UiO68-MOFs, a key property for long term utilization, MOFs were incubated in an aqueous solution with a fixed radioactivity of $^3$H-acetate, with the scintillation response measured daily (FIG. 9C). Over the course of one week, the decrease in scintillation response was less than 10%; where the response exhibited negligible change.

Many biochemical radioisotope measurements are made in solutions that result in non-specific absorption when particles are used for analytical measurements. Thus, we sought to evaluate the effect of surface passivation via non-specific absorption on the Zr-UiO68-MOFs. The scintillation response of Zr-UiO68-MOFs was evaluated in the presence of 1 mg·mL$^{-1}$ bovine serum albumin (BSA), a commonly used model for non-specific absorption. As shown in FIG. 9D, our results suggested the scintillation of Zr-UiO68-MOFs exhibited a linear function (R$^2$=0.982) in the presence of BSA.

In conclusion, we prepared stable, dispersible Zr-UiO68-MOFs SPs for measurement of low-energy radioisotopes directly in water or aqueous solutions. The scintillation response showed a highly linear relationship between the scintillating signals and radioactivity of spiked low-energy radioisotope. Overall, given their superior long-term stability and ease of use, our results present a new, simple and feasible way for measuring the low-energy radioisotope.

Prophetic Examples 5-8

Example 5. Detection of Radioisotope in Water Source

We anticipate that luminescent Zr-UiO68-MOFs will find broad use for radiometric detection and radioactive isotope monitoring in wide-ranging applications.

Water sample can be collected from a water source, for example in northern Arizona and Zr-MOFs or HF-MOFs prepared as described in above Examples can be added to the sample and tested for detection of emission of visible light from the sample using an optical detector. Detection of visible light from the sample indicates the presence of radioactive materials, such as $^{235}U$ in the water source.

Example 6. Detection of Radioisotope in Drinking Water

Drinking water sample can be collected, and Zr-MOFs or HF-MOFs prepared as described in above Examples can be added to the sample and taken for detection in an optical detector. Detection of emission of visible light from the sample indicates the presence of radioactive materials in the drinking water sample.

Example 7. Detecting Radiolabeled Fertilizer or Radiolabeled Pesticide in Crop Samples Crops can be grown in the presence of radiolabeled fertilizer or radiolabeled pesticide. Plant parts of the crop can be tested for presence of radiolabeled fertilizer or radiolabeled pesticide by collecting a plant part, homogenizing the plant part in water, adding a MOF as prepared in above Examples to the homogenized plant part in water, detecting emission of visible light in an optical detector. The detection of visible light from the MOF containing sample indicates the presence of radiolabeled fertilizer or radiolabeled pesticide in the crop.

Example 8. Tracing how Radiolabeled Crops are Metabolized by a Subject

If the radiolabeled crops from Example 7 are consumed by a subject (mammals, human or other animals), the metabolism of the radioisotope in the subject can be tracked with the MOFs of the preceding Examples. For example, a subject can be fed a crop treated with a radiolabeled fertilizer or a radiolabeled pesticide, then a blood sample of the subject can be obtained, an MOF added to the blood sample, and the resulting sample taken for detection in an optical detector. The detection of visible light from the sample indicates that the blood sample from the subject has radioactive substances from the consumption of the crop.

Example 9. General Procedure for Prepare Organic Linker

Chemicals

4-Carboxyphenylboronic acid (97%), 9,10-dibromoanthracene (98%), bovine serum albumin (BSA, ≥96%), potassium carbonate anhydrous (K2CO3, ≥99.9%) bis(triphenylphosphine) palladium (II) dichloride (PdCl¬2(PPh3)2, 98%), concentrated hydrochloric acid (HCl), zirconium chloride (ZrCl4, metals basis, ≥99.5%), sodium hydroxide, acetonitrile, ethanol, methanol, N, N-dimethylformamide (DMF), tetrahydrofuran (THF), hexane, trifluoroacetic acid (TFA, 98%) were purchased from Fisher Scientific and used as received. All the solvents used were HPLC grade. Tritium-labeled sodium acetate (3H-acetate, specific activity: 1.59 Ci·mmol-1) was obtained from Perkin Elmer (Waltham, MA). Ultrapure water (18.2 MΩ·cm) was used throughout the experiments.

Methods

Synthesis of Exemplary Polyaromatic Organic Linker Compound

As FIG. 8 shows, the DPA linker was synthesized following the reported procedures. See A. Mallick, A. M. El-Zohry, O. Shekhah, J. Yin, J. Jia, H. Aggarwal, A.-H. Emwas, O. F. Mohammed and M. Eddaoudi, J. Am. Chem. Soc., 2019, 141, 7245-7249. Initially, degas 20 mL acetonitrile and 20 mL 2 M potassium carbonate solution (add 5.585 g K2CO3 in 20 mL water) with argon for 2 hr. Then add 9,10-dibromoanthracene (1.714 g, 5 mmol, 1 eq), 4-carboxyphenylboronic acid (1.822 g, 11 mmol, 2.2 eq), PdCl¬2 (PPh3)2 (0.208 g, 0.29 mmol, 5.7 mol %) in an Ar-flushed 100 mL round-bottomed flask equipped with a stirring bar, subsequently add the degassed acetonitrile and potassium carbonate solution by using syringes and refluxed under 100° C. for 48 hr, the solution turned dark grey after the completion of the reaction. After cooling to room temperature, pour 50 mL water to the reaction mixture for quenching the reaction, followed by centrifugation at 5,000 rpm for 10 min to collect the supernatant and discard the dark pellet. Transfer the pale yellowish transparent solution to a 250 mL Erlenmeyer flask, then acidified the solution by using 2 M hydrochloric acid solution until the pH was lower than 2. Collect the crude products by centrifugation at 5,000 rpm for 20 min under 15° C., then wash the product with water for two times to remove extra acid and dried it overnight. The crude product was purified by recrystallization from THF/ hexane for several times to afford an off-white solid (yield=60%). 1H NMR (500 MHz, DMSO-d6): δ (ppm) =13.15 (s, 2H), 8.25-8.20 (m, 4H), 7.64-7.60 (m, 4H), 7.58-7.52 (m, 4H), 7.49-7.43 (m, 4H).

FIG. 8 provides an exemplary synthesis route for a DPA linker for the polyaromatic linker compound disclosed herein.

Synthesis of Zr-MOFs

The Zr-MOFs were prepared as described in C. Wang, O. Volotskova, K. Lu, M. Ahmad, C. Sun, L. Xing and W. Lin, J. Am. Chem. Soc., 2014, 136, 6171-6174, with minor modifications.

Typically, zirconium chloride (ZrCl4, 0.05 mmol), fluorescent organic linker (0.05 mmol), and trifluoroacetic acid (TFA, 62 µL, 0.8 mmol) were dispersed in N, N-dimethylformamide (DMF, 10 mL), sealed in a vial, and then sonicated until all reactants dissolved before placed in a preheated oil bath. The temperature was kept at 100° C. for 48 hr. After cooling to room temperature, the obtained MOFs were isolated by centrifugation, and washed with methanol and water repeatedly, then dispersed in water. The synthesized MOFs were stable in water and stored at room temperature.

MOF Characterization

The fluorescent spectra of Zr-MOFs were measured under 365 nm excitation by using a PTI fluorometer using Felix software. The scintillating signals were obtained by Beckman LS 6000 IC liquid scintillation counter (LSC) by using a HDPE 7 mL scintillation vial with a screw cap. The Scanning Electron Microscope (SEM) imaging was performed by FEI Inspect S SEM operating at 30 kV equipped with a Thermo Noran System Six X-ray microanalysis system as an energy-dispersive X-ray spectrometer (EDS).

Example 10. Fluorophore-Doped Metal-Organic Frameworks for Quantifying Low-Energy Radionuclides in Water or Aqueous Solutions Chemicals Terephthalic acid ($H_2L$ linker, ≥99%), benzoic acid (99%), zirconium chloride ($ZrCl_4$, metals basis, ≥99.5%), p-terphenyl (pTP, ≥99%), 1,4-bis(4-methyl-5-phenyl-2-oxa-zolyl)benzene (dimethyl-POPOP, ≥99%) sodium hydroxide (NaOH), hydrochloric acid (HCl), ethanol, methanol, toluene, N, N-dimethylformamide (DMF) were purchased from Fisher Scientific and used as received. Tritium-labeled sodium acetate (3H-acetate, specific activity: 1.59 Ci·mmol⁻1) was ordered from Perkin Elmer (Waltham, MA). High-purity water (18.2 MΩ·cm) was used throughout the experiments. All the use and operation of radioactive materials, including the generated hazardous wastes were handled and disposed according to guidelines provided by Research Laboratory & Safety Services (RLSS) at University of Arizona.

Methods

Synthesis of Fluorophore-Doped UiO-66

The preparation of UiO-66 was according to the prior works with minor modifications.[13] In general, zirconium chloride (ZrCl4, 2 mmol, 1 eq), terephthalic acid ($H_2L$ linker, 2 mmol, 1 eq), benzoic acid (20 mmol, 10 eq), concentrated HCl (4 mmol, 2 eq) were dispersed in N, N-dimethylformamide (DMF, 36 mL) in a 50 mL reaction vial, and then sonicated for 30 min for better dispersion all solid reactants, then place the reaction mixture in a 120° C. oil bath for 48 hr. The obtained UiO-66 were isolated by centrifugation at 5,000 rpm for 20 min and washed with methanol and acetone three times repeatedly to remove the unreacted reactants, then dispersed in 50 mL methanol as the stock solution of UiO-66 MOFs. A small aliquot (1 mL) of the UiO-66 solution was lyophilized to determine reaction yield (39%), and the weight per volume of UiO-66 (6.15 mg·mL⁻¹). For fluorophores encapsulation into UiO-66, pTP and dimethyl-POPOP were used and the optimized molecular ratio of pTP and dimethyl-POPOP was 10:1 based on prior studies,[14] and the weight ratio of overall fluorophores: UiO-66=10:1. The resulting solution was prepared in toluene with 1.5 mg·mL⁻¹ UiO-66 and then was placed in a 60° C. oil bath for 7 days to ensure the encapsulation of fluorophores into UiO-66. Doped UiO-66 was obtained by centrifugation at 5,000 rpm for 20 min and washed with methanol for removal of the undoped fluorophore, then finally dispersed in 50 mL water as the stock solution of fluorophore-doped UiO-66.

Characterization of UiO-66

The fluorescent spectra of UiO-66 were measured under 260 nm excitation using a PTI fluorometer. The crystal images of UiO-66 were taken by a field-emission Tecnai Spirit Twin transmission electron microscope (FEI Tecnai Spirit Twin TEM) at 100 keV accelerating voltage (FEI, Hillsboro, OR). TGA analysis of UiO-66 was done by using the TA5500 TGA System (Waters, TA Instruments, USA) in a TGA platinum pan, the collected TGA data was processed by TRIOS software. Tritium measurement was done using directly in water by Beckman LS 6000 IC liquid scintillation counter (LSC) in a HDPE 7 mL plastic scintillation vial with a screw cap.

Design and Synthesis of Fluorophore-Doped UiO-66

Figures 13A, 13B:
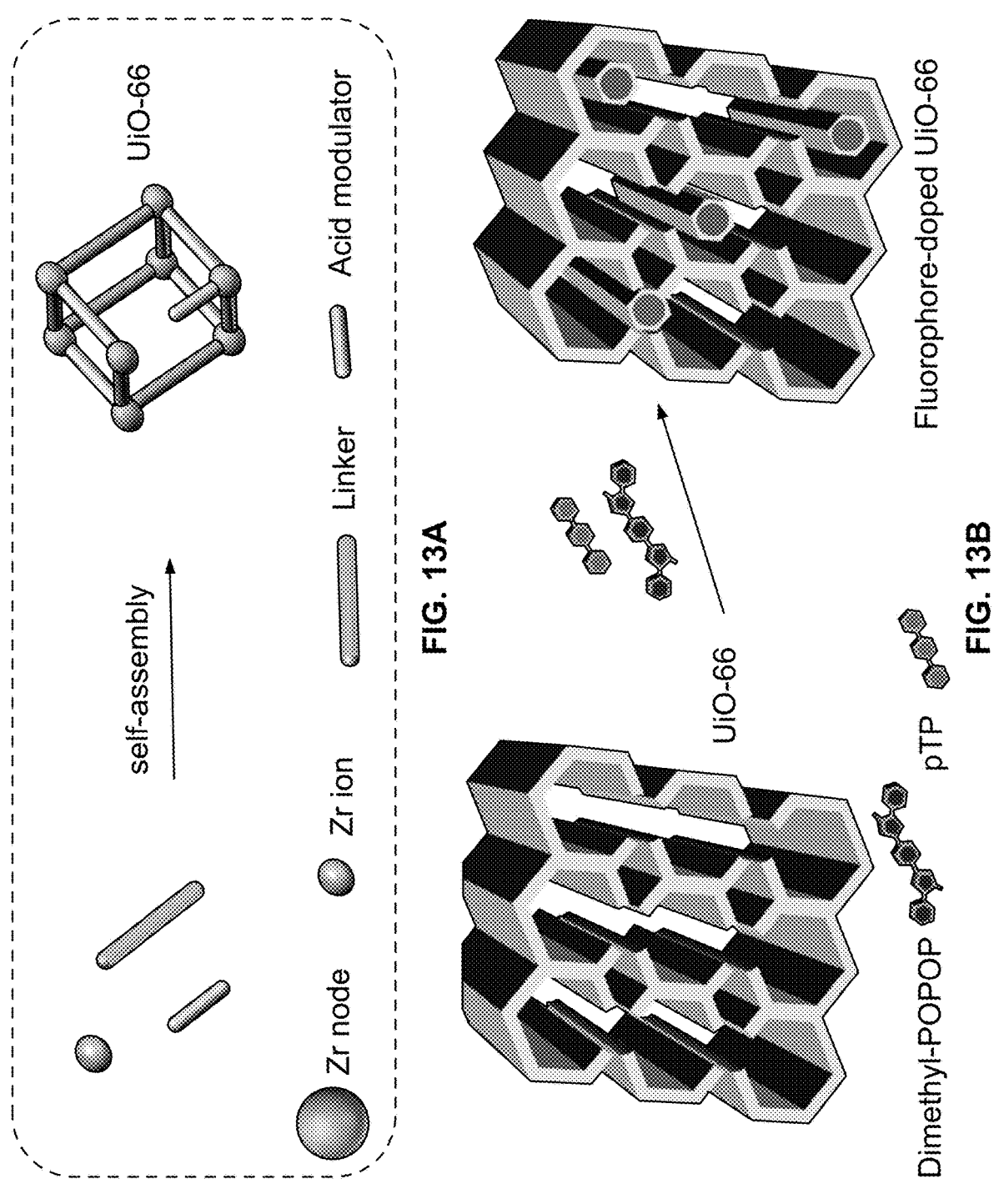
FIGS. 13A-13B. Schematic illustration of (FIG. 13A) synthesis route for UiO-66 by a self-assembly of organic linkers, inorganic metal ions, acid modulators and (FIG. 13B) direct doping of UiO-66 with pTP, dimethyl-POPOP, where the size of the apertures of UiO-66 spatially control the encapsulation of rod-like fluorophores.

Doped MOFs were designed to be capable of having better control doping homogeneity, in an attempt to establish an effective detection platform for probing low-energy radioisotopes in aqueous solutions. To this end, nanosized UiO-66 was chosen as a proof-of-concept for the preparation of fluorophore-doped UiO-66, due to its (i) ease of synthesis, (ii) nanoporosity (pore sizes of ca. 6 to 11 Å)[15], (iii) high stability and adaptability, and (iv) improved dispersability in aqueous solutions. Self-assembly (see FIG. 13A) was used to prepare nanosized UiO-66 using two acid mediators (i.e., benzoic acid, hydrochloric acid). Synthetic UiO-66 has larger octahedral and smaller tetrahedral pores, but those pores are smaller than 11 Å on average, so the direction of molecular diffusion and encapsulation of organic dopant(s), such as fluorescent additives, can be restricted. Two fluorescent additives, or fluorophores, pTP and dimethyl-POPOP were selected each having linear aromatic structures, as organic dopants. Dopants with rod-like molecular structures presumably enter porous UiO-66 along their molecular short axis, this tendency results in orientational alignment that demonstrates some degree of intrinsic order in three dimensions (see FIG. 13B).[16] It was predicted this could be used to and maintain the degree of intrinsic order of dopant(s) even when using a high doping concentration. Toluene was used to prepare a high concentration of a fluorophore solution (15 mg·mL⁻¹) with an optimized molar ratio of pTP and dimethyl-POPOP (10:1). In this instance, the mass ratio between fluorophore and UiO-66 was 10:1, which was much higher than the commonly-used ratio previously reported.[17] UiO-66 also avoided potential leaking from the material through dissolution during the doping process due to its higher adaptability in organic solvents. This stability ensured UiO-66 was able to maintain its intact structural features,[18] promoting the entrapping the fluorophores, while the dopants were uniformly in organic environments, but compatible with aqueous solutions.

Figures 14A, 14B, 14C:
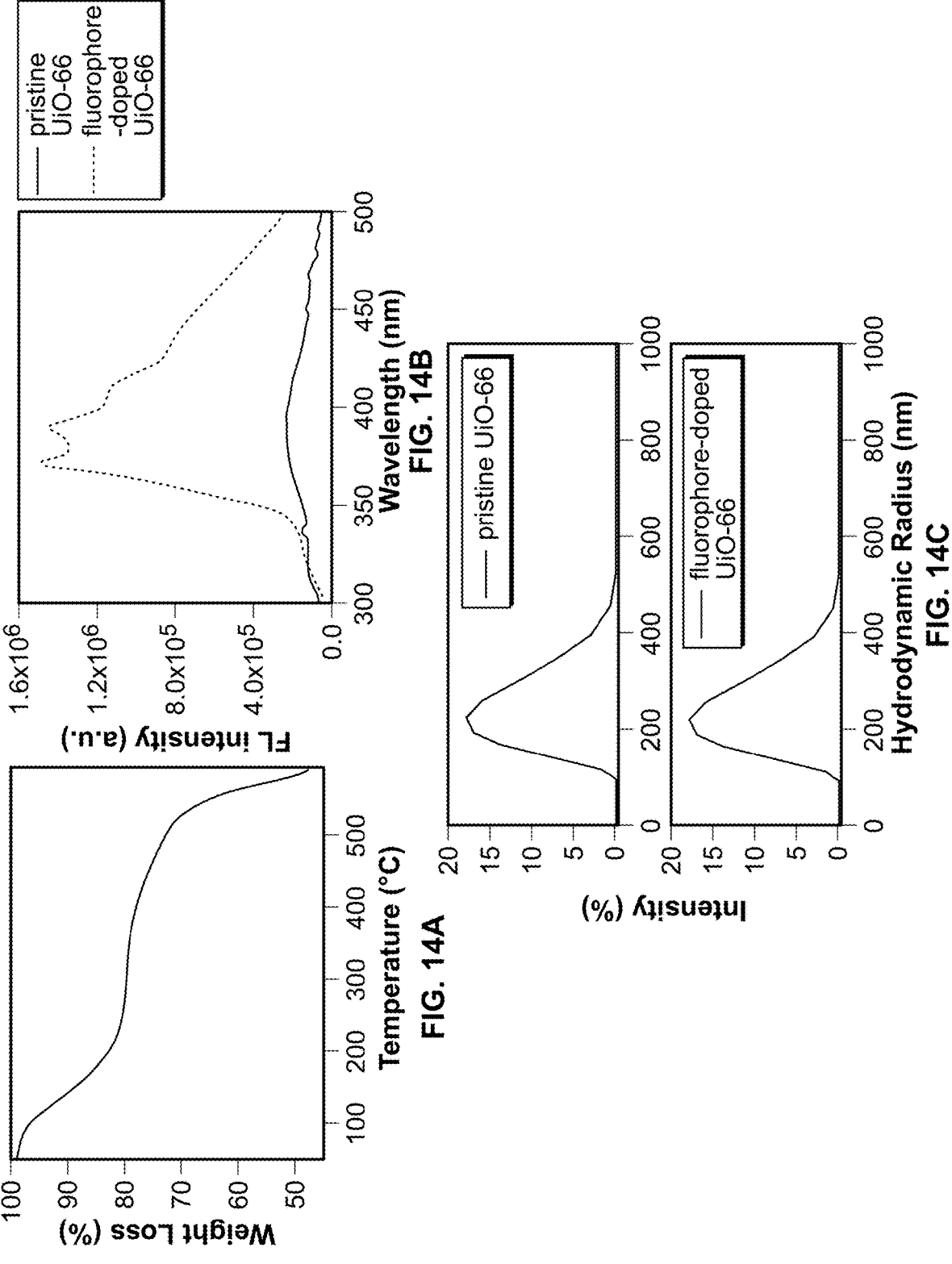
FIGS. 14A-14C.

Characterization of Fluorophore-doped UiO-66 To measure the crystal size of UiO-66, we used transmission electron microscopy (TEM) to image the synthetic UiO-66 (not shown). The result showed that the UiO-66 size was less than a hundred nanometers in dimensions. Also, thermogravimetric analysis (TGA) suggested the material decomposition of UiO-66 occurred at about 525° C. (see FIG. 14A). These results confirmed the successful preparation of nano-sized crystalline UiO-66. Next, UiO-66 was with pTP and dimethyl-POPOP. The fluorescent spectrum of doped UiO-66 showed a broadband emission derived from the embedded pTP and dimethyl-POPOP (see FIG. 14B). Also, the more broadening emission suggested the presence of entrapping pTP and dimethyl-POPOP, as compared to solely using pTP to dope UiO-66. The red-shifted emissions of entrapping fluorophores implied a local environmental change when embedded in the isolated environment of UiO-66. Similar behavior could often be observed when entrapping fluorophores in other MOFs.[19] To investigate whether the use of toluene in the doping process would cause the dissolution of UiO-66, the hydrodynamic radius of fluorophore-doped UiO-66 was measured. The results implied a similar size distribution of UiO-66 after interacting with a fluorophore toluene solution for one week (see FIG. 14C), further supporting that UiO-66 was able to keep its architecture and structural features intact after doping.

Quantitative Analysis of Low-Energy Radioisotope

Figures 15A, 15B, 15C:
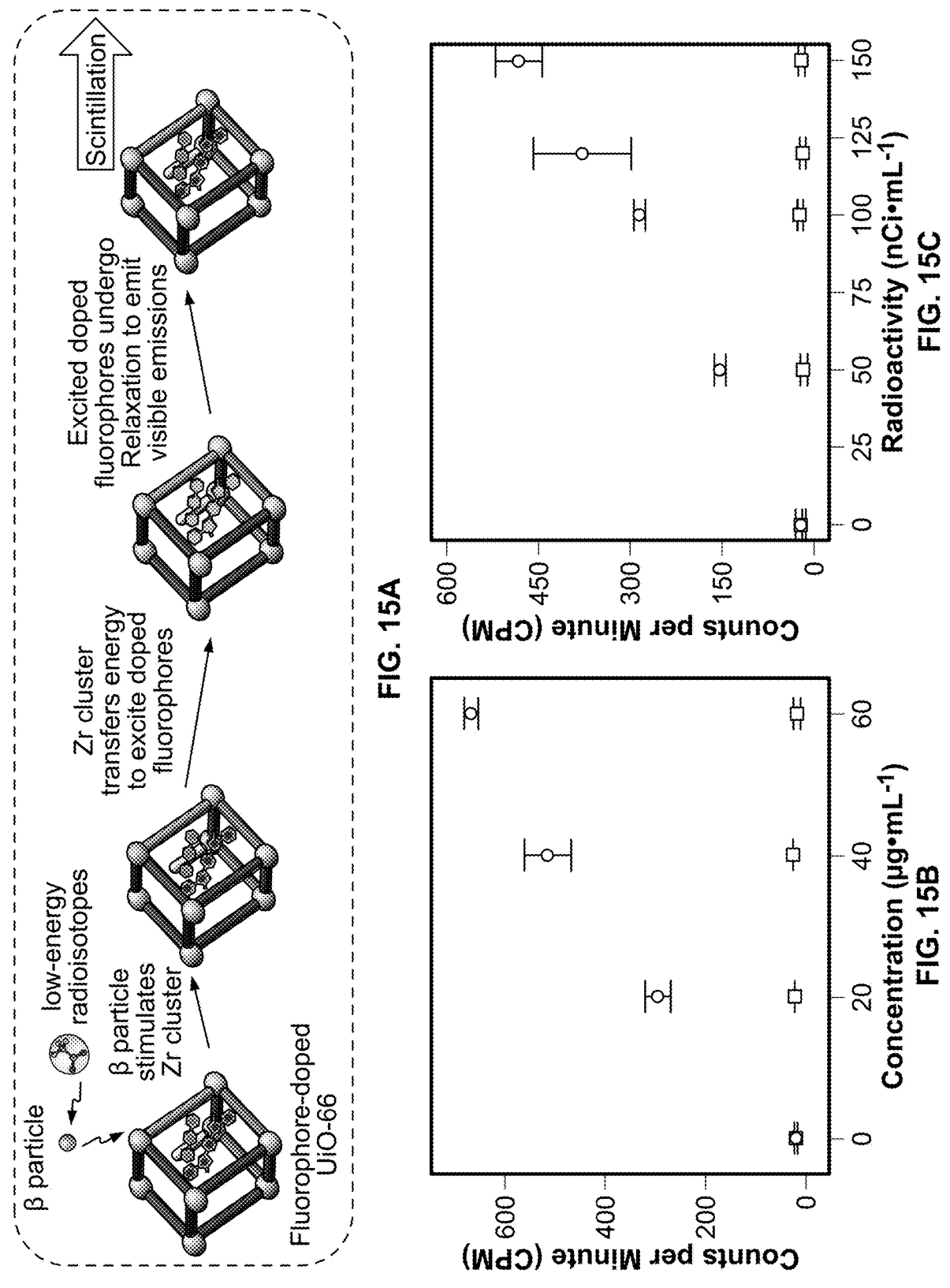
FIGS. 15A-C.

To investigate the fluorophore-doped UiO-66 was capable of detecting low-energy radioisotopes, tritium ($^3H$) was selected in the form of tritium-labeled acetate, as a source of low-energy radioisotope. Tritium with relatively lower emitted energy after radioactive decay makes it much more difficult to be detected than others, but has been more widely used in biological applications. Doped materials are options often used, doped inorganic and polymeric materials have been used, but the mechanism for detecting tritium is mostly similar, which is believed to rely on an energy conversion process. The host materials are used to absorb the emitted energy from a decaying nucleus, then transfer the absorbed energy to stimulate proximal dopants, the excited dopants will undergo electronic relaxation, subsequently emit detectable visible emissions (i.e., scintillate). UiO-66 is composed of organic and inorganic components and merges the benefits of inorganic and organic materials; also, their unique ordered structures hold the dopants in an orderly fashion to enhance the doping homogeneity to facilitate the energy conversion process to permit detection of tritium with higher efficiency.[20] The detection mechanism using fluorophore-doped UiO-66 is depicted in FIG. 15A. To characterize the entrapping fluorophore which causes the fluorophore-doped UiO-66 to scintillate, a 100 $nCi \cdot mL^{-1}$ tritium radioactivity was used to see how it affected the scintillation signals of fluorophore doped- and undoped UiO-66, as shown in FIG. 15B. The concentration of UiO-66 was also increased to understand if using high particle numbers of UiO-66 would enhance the scintillation signals. Fluorophore-doped UiO-66 showed significant and highly linear responses ($R^2=0.99$) as compared to the undoped UiO-66, implying the effect of the fluorophores.[21] Next it was investigated if UiO-66 was capable of quantifying tritium radioactivity in aqueous solutions, as shown in FIG. 15C. The results showed that the scintillation signals of fluorophore-doped UiO-66 were a linear function of tritium radioactivity ($R^2=0.99$), within a range from 0 to 150 $nCi \cdot mL^{-1}$. The limit of detection (LOD) was determined as 0.6 $nCi \cdot mL^{-1}$. While the undoped UiO-66 and blank solutions both exhibited lower responses, which could result from the trace amount of naturally occurring low-energy radioisotopes in the background environments.

CONCLUSIONS

Doped porous MOFs having organic fluorophores were investigated to determine if these were able to quantitatively measure low-energy radioisotopes in aqueous solutions. UiO-66, a MOF with smaller pore sizes to select molecules according to their size and geometry was used. Two organic fluorophores (pTP and dimethyl-POPOP) with a linear conformation were used as dopants. UiO-66 was able to demonstrate some order of doping homogeneity due to their pore apertures, which permitted molecular encapsulation in limited dimensions.

LIST OF REFERENCES CITED IN EXAMPLE 10

(1) Atzrodt, J.; Derdau, V.; Kerr, W. J.; Reid, M. Deuterium- and Tritium-Labelled Compounds: Applications in the Life Sciences. *Angew. Chem. Int. Ed.* 2018, 57 (7), 1758-1784.

(2) Brooks, F. D. Development of organic scintillators. *Nucl. Instrum. Methods Phys. Res.* 1979, 162 (1), 477-505.

(3) Bosworth, N.; Towers, P. Scintillation proximity assay. *Nature* 1989, 341 (6238), 167-168.

(4) Wu, P. J.; Kuo, S. Y.; Huang, Y. C.; Chen, C. P.; Chan, Y. H. Polydiacetylene-enclosed near-infrared fluorescent semiconducting polymer dots for bioimaging and sensing. *Anal. Chem.* 2014, 86 (10), 4831-4839.

(5) Lu, F.; Bai, L.; Yang, Z.; Liu, Q. Photoluminescence properties of Ce3+ doped YSiO2N blue-emitting phosphors. *J. Rare Earths* 2012, 30 (9), 851-855.

(6) Janczak, C. M.; Calderon, I. A. C.; Mokhtari, Z.; Aspinwall, C. A. Polystyrene-Core, Silica-Shell Scintillant Nanoparticles for Low-Energy Radionuclide Quantification in Aqueous Media. *ACS Appl. Mater. Interfaces* 2018, 10 (5), 4953-4960.

(7) Furukawa, H.; Cordova, K. E.; O'Keeffe, M.; Yaghi, O. M. The chemistry and applications of metal-organic frameworks. *Science* 2013, 341 (6149), 1230444.

(8) Chen, W.; Zhuang, Y.; Wang, L.; Lv, Y.; Liu, J.; Zhou, T. L.; Xie, R. J. Color-Tunable and High-Efficiency Dye-Encapsulated Metal-Organic Framework Composites Used for Smart White-Light-Emitting Diodes. *ACS Appl Mater Interfaces* 2018, 10 (22), 18910-18917.

(9) Wei, Y.; Dong, H.; Wei, C.; Zhang, W.; Yan, Y.; Zhao, Y. S. Wavelength-Tunable Microlasers Based on the Encapsulation of Organic Dye in Metal-Organic Frameworks. *Adv Mater* 2016, 28 (34), 7424-7429.

(10) Wang, K.; Duan, Y.; Chen, J.; Wang, H.; Liu, H. A dye encapsulated zinc-based metal-organic framework as a dual-emission sensor for highly sensitive detection of antibiotics. *Dalton Trans* 2022, 51 (2), 685-694.

(11) Li, T.; Gao, M.; Wu, Z.; Yang, J.; Mo, B.; Yu, S.; Gong, X.; Liu, J.; Wang, W.; Luo, S.; et al. Tantalum-Zirconium Co-Doped Metal-Organic Frameworks Sequentially Sensitize Radio-Radiodynamic-Immunotherapy for Metastatic Osteosarcoma. *Adv. Sci.* 2023, 10 (10), 2206779.

(12) Zhao, X.; Li, Y.; Du, L.; Deng, Z.; Jiang, M.; Zeng, S. Soft X-Ray Stimulated Lanthanide @MOF Nanoprobe for Amplifying Deep Tissue Synergistic Photodynamic and Antitumor Immunotherapy. *Adv Healthc Mater* 2021, 10 (21), e2101174.

(13) Chen, D.; Yang, D.; Dougherty, C. A.; Lu, W.; Wu, H.; He, X.; Cai, T.; Van Dort, M. E.; Ross, B. D.; Hong, H. In Vivo Targeting and Positron Emission Tomography Imaging of Tumor with Intrinsically Radioactive Metal-Organic Frameworks Nanomaterials. *ACS Nano* 2017, 11 (4), 4315-4327.

(14) Janczak, C. M.; Calderon, I. A. C.; Noviana, E.; Hadvani, P.; Lee, J. R.; Aspinwall, C. A. Hybrid Nanoparticle Platform for Nanoscale Scintillation Proximity Assay. *ACS Appl. Nano Mater.* 2019, 2 (3), 1259-1266.

(15) Cavka, J. H.; Jakobsen, S.; Olsbye, U.; Guillou, N.; Lamberti, C.; Bordiga, S.; Lillerud, K. P. A new zirconium inorganic building brick forming metal organic frameworks with exceptional stability. *J. Am. Chem. Soc.* 2008, 130 (42), 13850-13851.

(16) Megelski, S.; Lieb, A.; Pauchard, M.; Drechsler, A.; Glaus, S.; Debus, C.; Meixner, A. J.; Calzaferri, G. Orientation of Fluorescent Dyes in the Nano Channels of Zeolite L. *J. Phys. Chem. B* 2001, 105 (1), 25-35.

(17) Ye, L.; Mosbach, K. Polymers recognizing biomolecules based on a combination of molecular imprinting and proximity scintillation: a new sensor concept. *J. Am. Chem. Soc.* 2001, 123 (12), 2901-2902.

(18) Cavka, J. H.; Jakobsen, S.; Olsbye, U.; Guillou, N.; Lamberti, C.; Bordiga, S.; Lillerud, K. P. A new zirconium inorganic building brick forming metal organic frameworks with exceptional stability. *J. Am. Chem. Soc.* 2008, 130 (42), 13850-13851.

(19) Liu, Y.; Dong, H.; Wang, K.; Gao, Z.; Zhang, C.; Liu, X.; Zhao, Y. S.; Hu, F. Suppressing Nonradiative Processes of Organic Dye with Metal-Organic Framework Encapsulation toward Near-Infrared Solid-State Microlasers. *ACS Appl. Mater. Interfaces.* 2018, 10 (41), 35455-35461.

(20) Wang, C.; Volotskova, O.; Lu, K.; Ahmad, M.; Sun, C.; Xing, L.; Lin, W. Synergistic assembly of heavy metal clusters and luminescent organic bridging ligands in metal-organic frameworks for highly efficient X-ray scintillation. *J. Am. Chem. Soc.* 2014,136 (17), 6171-6174.

(21) Gutierrez, M.; Zhang, Y.; Tan, J. C. Confinement of Luminescent Guests in Metal-Organic Frameworks: Understanding Pathways from Synthesis and Multimodal Characterization to Potential Applications of LG@MOF Systems. *Chem Rev* 2022, 122 (11), 10438-10483.

All publications (including the Communication entitled: "Low-energy radionuclide sensing with luminescent metal-organic frameworks" by Ke et al. (manuscript submitted for publication) and those mentioned herein are incorporated by reference to the extent they support the present invention.

We claim:

1. A composition comprising:
a plurality of scintillatable metal-organic framework particles;
   wherein at least a primary fluorescent additive and optionally a secondary fluorescent additive are associated with the metal-organic framework particles; and
   wherein the metal-organic framework particles comprise a metal ion and a polyaromatic organic linker compound.

2. The composition of claim 1, wherein the composition further comprises a solvent in which the plurality of scintillatable metal-organic framework particles are disposed.

3. The composition of claim 2, wherein the solvent is an aqueous solvent or the solvent is water.

4. The composition of claim 2, wherein the solvent comprises an organic solvent.

5. The composition of claim 1, wherein the primary fluorescent additive is selected from the group consisting of PPD, PTP, PBD, PPO, a-NPD, pyrene, BBD, BPO, PBO, PBBO, O415, O408, DAT, BIBUQ, BPBD a derivative of any one of the foregoing primary fluorescent additives, and a combination of any two or more of the foregoing primary fluorescent additives.

6. The composition of claim 1, wherein the secondary fluorescent additive is selected from the group consisting of a-NPO, BBO, DPS, POPOP, bis-MSB, DM-POPOP, BBOT, TPB, 9,10-diphenylanthracene (DPA), Coumarin 510, Coumarin 540A, Coumarin 515, Coumarin 7, DPH, BBQ, a derivative of any one of the foregoing secondary fluorescent additives, and a mixture of any two or more of the foregoing secondary fluorescent additives.

7. The composition of claim 1, wherein the metal-organic framework particles contain pores having an average size of about 10 to about 50 Å, about 10 to about 45 Å, about 10 to about 40 Å, about 10 to about 35 Å, about 10 to about 30 Å, about 10 to about 25 Å, about 10 to about 20 Å, or about 10 to about 15 Å.

8. The composition of claim 1, wherein the metal-organic framework particles contain pores having an average size of less than about 50 Å, less than about 45 Å, less than about 40 Å, less than about 35 Å, less than about 30 Å, less than about 25 Å, less than about 20 Å, less than about 15 Å, or less than about 10 Å and greater than about 5 Å.

9. The composition of claim 7, wherein the at least primary fluorescent additive and secondary fluorescent additive are encapsulated within the pores of the metal-organic framework particles.

10. The composition of claim 1, wherein the metal ion is selected from the group consisting of Zr, Fe, Cr, Al, Eu, Cu, Zn, Ni, Mn, Ag, Ca, Pb, Tb, Sr, Yb, Gd, Sm, Ce, and Hf ions.

11. The composition of claim 1, wherein the metal is present in the particles from about 15 wt % to about 35 wt %.

12. The composition of claim 1, wherein the polyaromatic organic linker compound comprises a functional group selected from the group consisting of terphenyl (e.g., p-Terphenyl), stilbene (e.g., trans-stilbene), 1,4-phenylene-2,2'-bisoxazole, stilbene, dimethyl POPOP, PPD, PPO, DPA, and derivatives thereof.

13. The composition of claim 2, wherein the plurality of scintillatable metal-organic framework particles are present in the composition from about 0.1 mg/mL to about 30 mg/mL.

14. The composition of claim 1, wherein the metal-organic framework particles comprise Universitetet i Oslo (UiO) metal-organic framework particles selected from the group consisting of UiO-64, UiO-66, UiO-67, UiO-68, and UiO-69, or a combination thereof.

15. A method of quantifying a radioisotope, the method comprising:
   (i) exposing the composition of claim 1 to a radioisotope; and
   (ii) quantifying luminescence of the scintillation signals emitted from the composition;
   wherein the radioisotope is selected from the group consisting of a free radioisotope, a radioisotope bound to a radioligand, and combinations thereof.

16. The method of claim 15, wherein the radioisotope is a beta particle emitting radioisotope selected from the group consisting of $^3$H, $^{14}$C, $^{22}$Na, $^{33}$P, $^{35}$S, $^{45}$Ca, $^{125}$I, $^{32}$P, $^{235}$U, $^{225}$Ac and $^{86}$Rb.

17. The method of claim 15, wherein the radioisotope is a gamma photon energy emitting radioisotope.

18. The method of claim 15, wherein the radioisotope is an alpha particle emitting radioisotope selected from the group consisting of $^{209}$Bi, $^{211}$Bi, $^{212}$Bi, $^{213}$Bi, $^{210}$Po, $^{211}$Po, $^{212}$Po, $^{214}$Po, $^{215}$Po, $^{216}$Po, $^{218}$Po, $^{215}$At, $^{217}$At, $^{218}$At, $^{218}$Rn, $^{219}$Rn, $^{220}$Rn, $^{222}$Rn, $^{226}$Rn, $^{221}$Fr, $^{223}$Ra, $^{224}$Ra, $^{226}$Ra, $^{225}$Ac, $^{227}$Ac, $^{227}$Th, $^{228}$Th, $^{229}$Th, $^{230}$Th, $^{232}$Th, $^{231}$Pa, $^{233}$U, $^{234}$U, $^{235}$U, $^{236}$U, $^{238}$U, $^{237}$Np, $^{238}$Pu, $^{239}$Pu, $^{240}$Pu, $^{244}$Pu, $^{241}$Am, $^{244}$Cm, $^{245}$Cm, $^{248}$Cm, $^{249}$Cf, and $^{252}$Cf.

19. The method of claim 15, further comprising (iii) calculating a quantity of the radioisotope exposed to the composition.

20. The method of claim 19, wherein step (ii) comprises measuring the scintillation signals at a selected wavelength or at a selected plurality of wavelengths using a scintillation counter.

* * * * *